(12) United States Patent
Scharff et al.

(10) Patent No.: US 8,896,564 B2
(45) Date of Patent: Nov. 25, 2014

(54) ACOUSTIC TOUCH APPARATUS

(71) Applicant: Elo Touch Solutions, Inc., Milpitas, CA (US)

(72) Inventors: Daniel H. Scharff, San Leandro, CA (US); Joel C. Kent, Fremont, CA (US); Damien Berget, Belmont, CA (US)

(73) Assignee: Elo Touch Solutions, Inc., Menlo Park, CA (US)

( * ) Notice: Subject to any disclaimer, the term of this patent is extended or adjusted under 35 U.S.C. 154(b) by 0 days.

(21) Appl. No.: 14/351,013

(22) PCT Filed: Oct. 15, 2012

(86) PCT No.: PCT/US2012/060272
§ 371 (c)(1),
(2), (4) Date: Apr. 10, 2014

(87) PCT Pub. No.: WO2013/056239
PCT Pub. Date: Apr. 18, 2013

(65) Prior Publication Data
US 2014/0253517 A1     Sep. 11, 2014

Related U.S. Application Data

(63) Continuation-in-part of application No. 13/274,173, filed on Oct. 14, 2011, now Pat. No. 8,681,128.

(51) Int. Cl.
*G06F 3/043* (2006.01)

(52) U.S. Cl.
CPC .................................. *G06F 3/0436* (2013.01)
USPC ........................................... 345/173; 345/177

(58) Field of Classification Search
USPC ......................................................... 345/173
See application file for complete search history.

(56) References Cited

U.S. PATENT DOCUMENTS

| | | | |
|---|---|---|---|
| 2002/0005838 A1* | 1/2002 | Inoue et al. | 345/173 |
| 2004/0178999 A1* | 9/2004 | Cheng et al. | 345/177 |
| 2010/0013783 A1 | 1/2010 | St. Piere | |
| 2010/0117993 A1* | 5/2010 | Kent | 345/177 |
| 2011/0234545 A1 | 9/2011 | Tanaka et al. | |
| 2013/0038545 A1* | 2/2013 | Hsu et al. | 345/173 |

FOREIGN PATENT DOCUMENTS

GB         2 034 039 A      5/1980

OTHER PUBLICATIONS

International Search Report and Written Opinion for Application No. PCT/US2012//060272 dated Feb. 4, 2013.

* cited by examiner

*Primary Examiner* — Van Chow
(74) *Attorney, Agent, or Firm* — Alston & Bird LLP

(57) ABSTRACT

An improved acoustic touch apparatus that has a logo or application icon applied on the back surface of a propagating substrate which can be viewed through the substrate and an acoustic element situated adjacent the logo or application icon that can compensate for phase velocity shifts of surface acoustic waves in propagating over the logo or application icon.

35 Claims, 17 Drawing Sheets

ACOUSTIC TOUCH APPARATUS

FIELD OF THE INVENTION

This invention generally relates to acoustic touch sensors and, more particularly, to surface acoustic wave (SAW) touch screens.

BACKGROUND OF THE INVENTION

Touch sensor systems, such as touch screens or touch monitors, can act as input devices for interactive computer systems used for various applications, for example, information kiosks, order entry systems, video displays, mobile communications, etc. Such systems may be integrated into a computing device, thus providing interactive touch capable computing devices, including computers, electronic book readers, or mobile communications devices.

Generally, touch sensor systems enable the determination of a position on the surface of a substrate via a user's touch of the surface. The touch substrate is typically made of some form of glass which overlies a computer or computing device display, like a liquid crystal display (LCD), a cathode ray tube (CRT), plasma, etc. The touch sensor system is operatively connected to the device display so that it also enables the determination of a position on the device display and, moreover, of the appropriate control action of a user interface shown on the display.

Touch sensor systems may be implemented using different technologies. Acoustic touch sensors, such as ultrasonic touch sensors using surface acoustic waves, are currently one of the available touch sensor technologies and many types of acoustic touch sensors now exist. For example, an "Adler-type" acoustic touch sensor uses only two transducers per coordinate axis to spatially spread a transmitted surface acoustic wave signal and determines the touch surface coordinates by analyzing temporal aspects of a wave perturbation from a touch. For each axis, one transducer at a respective peripheral surface generates surface acoustic wave pulses that propagate through the substrate along a perpendicular peripheral surface along which a first reflective grating or array is disposed. The first reflective array is adapted to reflect portions of a surface acoustic wave perpendicularly across the substrate along plural parallel paths to a second reflective array disposed on the opposite peripheral surface. The second reflective array reflects the surface acoustic wave along the peripheral surface to a second transducer where the wave is received for processing. The reflective arrays associated with the X axis are perpendicular to the reflective arrays associated with the Y axis so as to provide a grid pattern to enable two-dimensional coordinates of a touch on the substrate to be determined. Touching the substrate surface at a point causes a loss of energy by the surface acoustic waves passing through the point of touch. This is manifested as an attenuation of the surface acoustic waves and is detected by the receiving transducers as a perturbation in the surface acoustic wave signal. A time delay analysis of the data is used to determine the surface coordinates of a touch on the substrate.

An acoustic touch sensor may have a large number of operative elements (either multiple transducers, or transducer and reflective array combinations) disposed on, and along, the front peripheral surfaces of the substrate. In order to prevent damage due to exposure from the environment or external objects, the housing for these sensors or for the devices integrating a sensor may include a bezel for the front peripheral surfaces of the touch substrate that hides and protects these peripheral operative elements, so that only an active touch region on the front surface of the substrate is exposed for possible touch input. For bezel-less acoustic touch sensors, the peripheral operative elements may be located on the back peripheral surfaces of the substrate (in this case, a surface acoustic wave propagates around a substrate rounded edge, across the front surface, and around the opposite substrate rounded edge to reach the receiving elements). Thin-width bezel and bezel-less acoustic touch sensors each enlarge the active touch region to essentially the whole front surface of the substrate, which may be beneficial for small-sized integrated devices, like a smartphone, a tablet computer, an electronic book reader, or other mobile computing device.

As the active touch region enlarges, more device features and touch functions may be provided in the active touch region. In some cases, however, these additional features and functions may interfere with the propagation of surface acoustic waves on the touch substrate. For example, in many bezel-less systems that have certain aesthetic considerations, the periphery of the back surface of the substrate may have an opaque ink or paint applied thereon with the peripheral operative elements, such as the reflective arrays and transducers, being printed on top of the "border paint" so that these elements are hidden from view through the typically transparent substrate. Further, a logo or application icon may be printed directly on the periphery of the back surface of the substrate underneath the border paint. This permits the printed logo or application icon to be seen through the substrate. Alternatively, the paint may be applied over (as described below) a cut out in the border paint having the shape of the logo or icon. However, a dip in the received signals at the receiving transducers as well as a sharp phase difference of the received surface acoustic waves may be observed at the location of the printed logo or application icon. In particular, observations show that there is a definite dip in the received signal and sharp phase differences in the received surface acoustic waves that correspond to the start of the printed material of the icon or application icon and again at the end of the printed material. Generally, it is believed that a surface acoustic wave experiences changes in velocity in passing over the printed material (and thus loses phase coherence) resulting in the observed effects. The paint layering and the likely, slower velocity of propagation of the printed material suggest reasons for the observed effects.

More specifically, it is believed that several types of reduced signal may result because of the printed material. In a first case that the printed material partially overlaps the reflective arrays, the signal downstream of the printed material slopes downward. This can be attributed to the printed material slightly redirecting the surface acoustic waves. In the second case that the printed material completely or mainly overlaps the reflective arrays, the signal downstream of the printed material is depressed. This can be attributed to the attenuation of horizontal surface acoustic waves going through the printed material paint. If the printed material extends below the reflective arrays, a dip in the received signal at the start of the printed material, because of the phase difference, is regularly observed. There should be another dip in the received signal at the end of the printed material, again due to the phase difference; however, this is not usually observed, possibly because it is masked. Also, if the printed material extends below the reflective arrays, the dip in the received signal will have the width of the printed material. This is due to the attenuation of the surface acoustic waves traveling in the vertical direction away from the reflective array.

It would be advantageous to have an improved acoustic touch apparatus that compensates for certain of the effects of surface acoustic wave velocity changes in passing over the printed material and averts reduced received signals that may result.

SUMMARY OF THE INVENTION

The above problems are obviated by the present invention which provides an acoustic touch apparatus, comprising a substrate having surfaces capable of propagating surface acoustic waves; at least one acoustic wave transducer on a first surface; and at least one reflective array on the first surface, said transducer capable of transmitting or receiving surface acoustic waves to or from the reflective array and said reflective array capable of acoustically coupling surface acoustic waves to propagate between surfaces of the substrate, and said substrate having a first acoustic element disposed on the first surface that intercepts propagating surface acoustic waves on the first surface and causes variations in the phase velocity of the propagating surface acoustic waves and a second acoustic element disposed on the first surface that equalizes the variations. The second acoustic element may cancel out the phase advance or delay of any portion of the propagating surface acoustic waves intercepted by the first acoustic element. The second acoustic element may be disposed on the first surface in proximity to the first acoustic element or as physically close as possible to the first acoustic element.

Also, the second acoustic element may be adapted to intercept propagating surface acoustic waves intercepted by the first acoustic element. In such case, the second acoustic element may counteract the phase advance of any portion of the propagating surface acoustic waves intercepted by the first acoustic element. Also, the second acoustic element may be adapted to intercept propagating surface acoustic waves parallel to the propagating surface acoustic waves intercepted by the first acoustic element. In such case, the second acoustic element may counteract the phase advance of a portion of the propagating surface acoustic waves parallel to the propagating surface acoustic waves intercepted by the first acoustic element.

The first acoustic element may comprise a cut-out of a layer of acoustically benign material applied along the border of the first surface and a patch of acoustic material applied over the cut-out. The layer of acoustically benign material may comprise a first opaque ink and the patch comprises a second opaque ink having different visual properties than the first opaque ink. Alternatively, the first acoustic element may comprise a cut-out of a layer of acoustically benign material applied along the border of the first surface and an acoustic material filling in the cut-out, said first and second materials being visually distinguished from one another.

Alternatively, the first acoustic element may comprise acoustic material applied on the first surface and disposed under a layer of acoustically benign material applied along the border of the first surface. In such case, the layer of acoustically benign material may comprise a first opaque ink and the acoustic material of the first acoustic element comprises a second opaque ink having different visual properties than the first opaque ink. Also, the second acoustic element may comprise acoustic material disposed adjacent the first acoustic element and either over or under the layer of acoustically benign material applied along the border of the first surface. In such case, the first acoustic element may comprise a plurality of shapes and the second acoustic element is formed with a shape that is a composite of the plurality of the shapes of the first acoustic element, or the first acoustic element may comprise a plurality of separated shapes and the second acoustic element comprises a plurality of separated segments that are interspersed with the shapes, each segment disposed adjacent a respective shape and at least partially intercepting a portion of the propagating surface acoustic waves that are parallel to the propagating surface acoustic waves intercepted by the respective shape.

Alternatively, the second acoustic element may comprise acoustic material disposed adjacent the cut-out over the layer of acoustically benign material applied along the border of the first surface and either over or under the patch. Alternatively, the second acoustic element may comprise acoustic material disposed on the patch over the cut-out. In such case, the second acoustic element may comprise acoustic material that has the same form as the cut-out and is disposed on the patch so as to be superimposed on the cut-out and the superimposed acoustic material may be aligned with the cut-out within 100 microns.

The reflective array may be disposed over the layer of acoustically benign material along the border of the first surface; the cut-out and the patch of the first acoustic element; and the second acoustic element, said propagating surface acoustic waves intercepted by the first acoustic element comprising a portion of the surface acoustic waves interacting with the reflective array, or the reflective array may be disposed over the layer of acoustically benign material along the border of the first surface; the first acoustic element; and the second acoustic element, said propagating surface acoustic waves intercepted by the first acoustic element comprising a portion of the surface acoustic waves interacting with the reflective array.

The cut-out may comprise a plurality of shapes and the second acoustic element is formed with a shape that is a composite of the plurality of the shapes of the cut-out, or the cut-out may comprise a plurality of separated shapes and the second acoustic element comprises a plurality of separated segments that are interspersed among the shapes, each segment disposed adjacent a respective shape and at least partially intercepting the propagating surface acoustic waves intercepted by the respective shape.

Further, the second acoustic element may comprise an extension of the patch disposed over the layer of acoustically benign material that intercepts at least a portion of the propagating surface acoustic waves that are parallel to the propagating surface acoustic waves intercepted by the patch. The extension of the patch may comprise a first portion that intercepts surface acoustic waves traveling in a first direction and a second portion that intercepts surface acoustic waves traveling in a second direction perpendicular to the first direction. Alternatively, the extension of the patch comprises either a layer of glass frit or a layer of glass frit disposed on a layer of acoustic material which is the same as the patch acoustic material applied over the cut-out.

Further, the reflective array may be disposed over the layer of acoustically benign material along the border of the first surface and at least a portion of the cut-out and the patch of the first acoustic element, said propagating surface acoustic waves intercepted by the first acoustic element comprising a portion of the surface acoustic waves interacting with the reflective array, and the second acoustic element may comprise the portion of the reflective array disposed over the cut-out and the patch, said portion having a higher density of reflector elements than the remainder of the reflective array. The higher density may maintain reflector element spacing equal to an integral multiple of the surface acoustic wave wavelength transmitted by the transducer. Alternatively, the higher density may obtain a desired phase velocity of the surface acoustic waves transmitted by the transducer.

The present invention also provides a method of compensating for attenuated signals received by an acoustic wave transducer in an acoustic touch apparatus having a substrate with at least two surfaces capable of propagating surface acoustic waves and acoustic material disposed on one of the propagating surfaces that forms an identification marking, comprising counteracting changes in the phase velocities of the propagating surface acoustic waves passing over the disposed acoustic material. The counteracting step may comprise disposing a frit pattern on the propagating surface adjacent the disposed acoustic material. The counteracting step may comprise equalizing the phase velocities of the beams that comprise the propagating surface acoustic waves passing over the disposed acoustic material.

The present invention also provides a method of providing an acoustic touch apparatus with a frit pattern that is associated with an icon located on a propagating surface of a substrate of the apparatus, comprising forming the frit pattern with an acoustic material that provides a gradated compensation of changes to the velocities of the surface acoustic waves from the propagating surface through the icon.

The present invention also provides a method of providing an acoustic touch apparatus with a frit pattern to counteract changes in the phase velocities of propagating surface acoustic waves passing over acoustic material that is disposed on a propagating surface of a substrate of the apparatus and that forms an identification marking, comprising forming the frit pattern with a first segment that leads into one end of the length of the identification marking and a second segment that leads into the opposite end of the length of the identification marking; forming the segments of the frit pattern with graded dimensions that provide a gradated change in the phase velocities of the surface acoustic waves from the surrounding propagating surface to the identification marking; and adjusting the frit pattern, as needed, to accommodate the layout and the particular features on the propagating surface. The method may further comprise forming the frit pattern with at least one third segment that fills in at least one area of the propagating surface surrounding the identification marking. The method may further comprise juxtaposing the segments of the frit pattern and the identification marking in a compact manner.

The present invention also provides an acoustic touch apparatus, comprising a first corrective structure for transmitted surface acoustic wave (SAW) rays propagating parallel to the reflective array axis through an identification marking on the propagating surface, said first structure providing correction for phase velocity shifts to one direction of SAW propagation. The first structure may provide correction for refractive bending of transmitted SAW rays. The first structure may comprise additional reflective array elements for obtaining a desired phase velocity of transmitted SAW rays propagating through the reflective array. The first structure may comprise acoustic material applied over the identification marking to compensate for errant scattering of transmitted SAW rays by the identification marking.

The apparatus may further comprise a second corrective structure for scattered SAW rays propagating perpendicular to the reflective array axis through the identification marking, said first and second structures providing correction for phase velocity shifts simultaneously to two different directions of SAW propagation. The first and second corrective structures may comprise acoustic material on the propagating surface that equalizes the phase velocities of the SAW rays propagating through the identification marking. The first and second corrective structures may comprise acoustic material on the propagating surface that equalizes the phase velocities of the SAW rays propagating through the identification marking with the SAW rays propagating apart from the identification marking. The first structure may provide correction for refractive bending of transmitted SAW rays and the second structure may provide correction for refractive bending of deflected SAW rays.

BRIEF DESCRIPTION OF THE DRAWINGS

For a better understanding of the present invention, reference is made to the following description of exemplary embodiments thereof, and to the accompanying drawings, wherein.

DETAILED DESCRIPTION OF SPECIFIC EMBODIMENTS OF THE INVENTION

Figure 1:
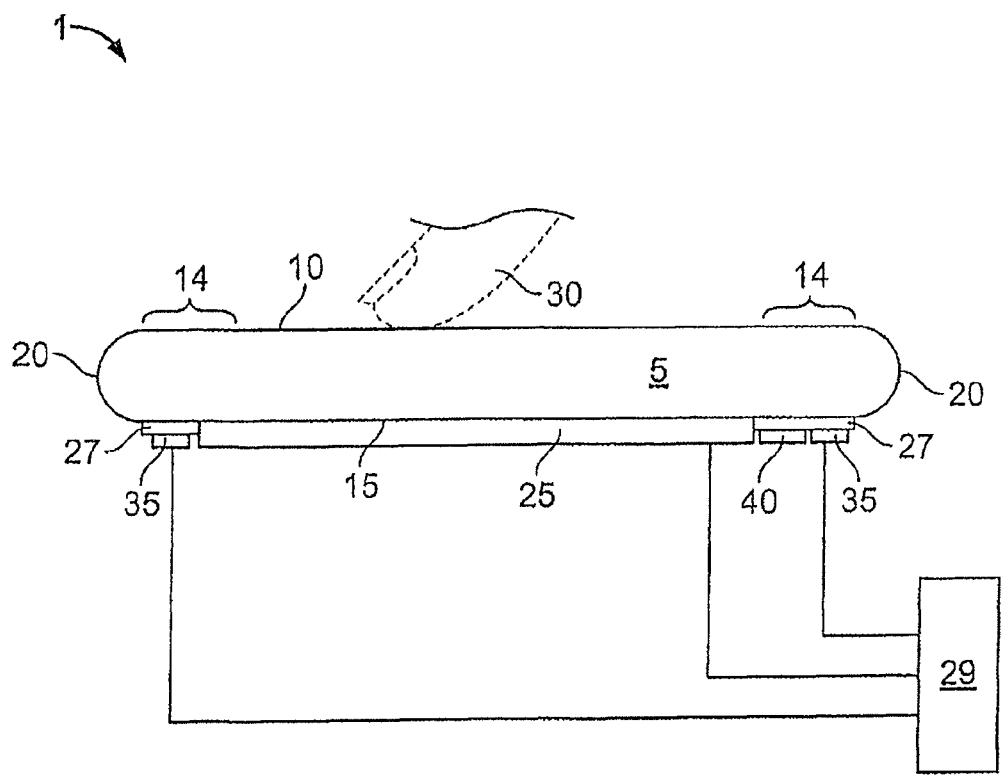
FIG. 1 is a simplified cross-sectional view of an acoustic touch sensor.

FIG. 1 shows a simplified cross-sectional view of an acoustic touch sensor 1. The touch sensor 1 comprises a substrate 5 with a front surface 10, a back surface 15, and connecting surfaces 20 joining the peripheral regions 14 of the front surface 10 and of the back surface 15. A connecting surface 20 need not be curved as shown but generally can have any shape that supports transfer of surface acoustic waves between the front and back surfaces 10, 15. The substrate 5 is typically made of some form of glass which overlies a computer display or computing device display 25, like a liquid crystal display (LCD), a cathode ray tube (CRT), plasma, etc. In a bezeled surface acoustic wave touch sensor, the peripheral region 14 of the front surface 10 is covered by a bezel provided by the housing of the touch sensor 1 or the device integrating the sensor 1, since the transducers and reflective arrays are on the front surface 10 of the substrate 5. In a bezel-less surface acoustic wave touch sensor, which is shown in the figures, the peripheral region 14 of the front surface 10 is merely the outer/peripheral portion of the front surface 10 and no bezel is required of the associated housing as there are no exposed transducers and reflective arrays. Note that the terms "bezeled" and "bezel-less" are adjectives that do not describe the structure of the touch sensor itself, but rather describe how the touch sensor is integrated into a larger mechanical assembly. Bezel-less surface acoustic wave touch sensors are described in more detail in U.S. patent application Ser. No. 13/012,513, entitled "BEZEL-LESS ACOUSTIC TOUCH APPARATUS" by Tanaka et al., filed on Jan. 24, 2011, which is herein incorporated by reference. Object 30 is seen in FIG. 1 as a finger, but it is recognized that touches sensed by the surface acoustic waves may include a stylus pressing against the front surface 10 directly or indirectly, through a cover sheet or like element, depending upon the application of the touch sensor 1. Acoustic transducers 35 and reflective element arrays 40 are provided on a border layer 27 of paint or ink (discussed further below) in the peripheral region 14 of the back surface 15. The transducers 35 are operably coupled to a controller or control system 29 (which may be part of a system processor in some embodiments) that is also operably coupled to the display 25. The controller or control system 29 drives the operation of the transducers 35 and measures the signals from such transducers to determine the touch coordinates, which are then provided to an operating system and software applications to provide the required user interface with the display 25.

Figure 2A:
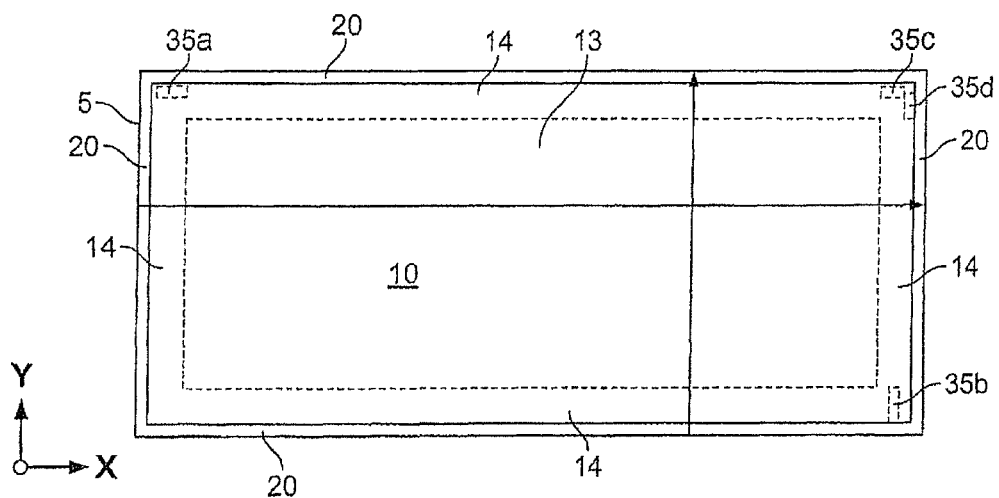
FIGS. 2(A) and 2(B), respectively, are front and back plan views of the substrate of the acoustic touch sensor of FIG. 1.
Figure 2B:
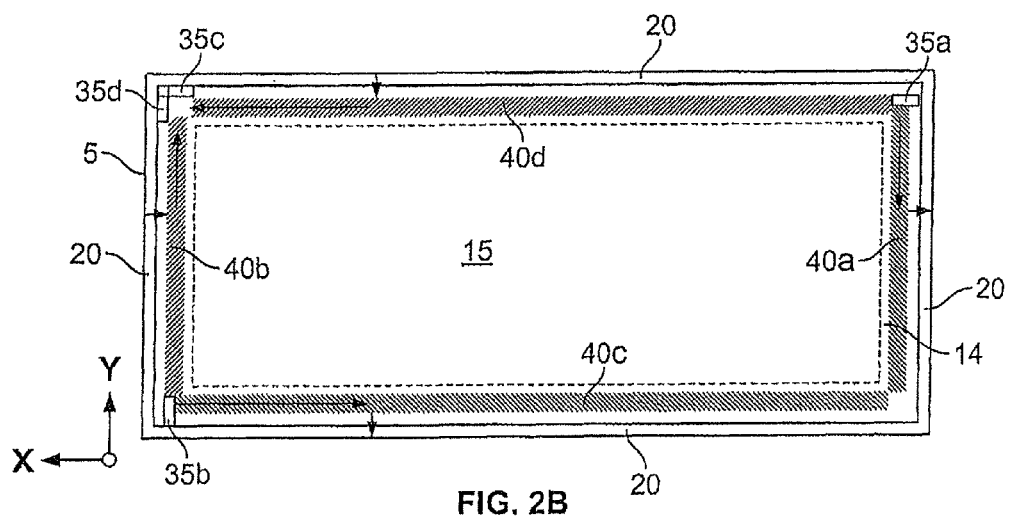

FIGS. 2(A) and 2(B), respectively, are front and back views of the touch substrate 5. In FIG. 2(A), which is a plan view of the front surface 10, the acoustic transducers 35a, 35b, 35c, 35d are shown in dotted line to provide a frame of reference in relation to FIG. 2(B), which is a plan view of the back surface 15, where the transducers 35a, 35b, 35c, 35d are situated and shown in solid line. Also, the peripheral region 14 is shown in dotted line in FIGS. 2(A) and 2(B) and applies to both surfaces 10, 15 of the touch substrate 5. To provide a further frame of reference, X-Y coordinate axes are shown in FIGS. 2(A) and 2(B).

The front surface 10 has an inner portion 13 shown within dotted lines in FIG. 2(A), and optionally also an outer/peripheral portion 14, form a nominal touch region on which the object 30 creates a contact to provide input according to the graphical user interface shown on the display 25 (shown in FIG. 1) disposed behind the back surface 15 and visible through the transparent substrate 5. In some bezel-less acoustic touch sensors, the nominal touch region may also comprise the curved connecting surfaces 20 or portions thereof. For a bezeled surface acoustic wave touch sensor, the inner portion 13 not covered by a bezel forms the touch region.

The touch sensor 1 has two pairs of transducers 35 respectively for the X and Y axes that are located in the peripheral region 14 of the back surface 15. The two pairs of transducers 35 are disposed at right angles to define a two-dimensional coordinate system. In particular, a first transmitting transducer 35a is placed in a Y-axis transmitting area and a second transmitting transducer 35b is placed in an X-axis transmitting area. A first receiving transducer 35c is placed in a Y-axis receiving area opposite the Y-axis transmitting area. A second receiving transducer 35d is placed in an X-axis receiving area opposite the X-axis transmitting area. The first transmitting transducer 35a and first receiving transducer 35c are used to detect the touch positions of the Y-coordinate on the front substrate 10, and the second transmitting transducer 35b and second receiving transducer 35d are used to detect touch positions of the X-coordinate on the front substrate 10. Each transducer 35 may either transmit or receive a surface acoustic wave, symmetrically. The touch sensor 1 also includes a pair of Y-axis reflective arrays 40a, 40b and a pair of X-axis reflective arrays 40c, 40d that are located in the peripheral region 14 of the back surface 15 in the respective transmitting and receiving areas. The reflective arrays 40 reflect a surface acoustic wave in a desired direction, as described below.

As noted above, the touch sensor 1 is operatively connected with a control system 29 (shown in FIG. 1) for the associated computer or computing device that integrates the sensor 1.

The control system 29 generates an electronic signal that excites the transmitting transducers 35a, 35b to generate respective surface acoustic waves (or wave pulses). The control system 29 also receives respective electrical signals transduced by the receiving transducers 35c, 35d from the received surface acoustic waves. The control system 29, as used herein, means electronics typically including a microprocessor with firmware and analog electronics to generate excitation signals and to receive back and analyze signals from the touch sensor 1.

In operation, the first transmitting transducer 35a generates surface acoustic waves that travel along the negative (−) Y-axis direction of the peripheral region 14 of the back surface 15 on which the first Y-axis reflective array 40a is situated. The elements of the first Y-axis reflective array 40a each transmit part of the surface acoustic waves to an adjacent element of the array 40a. Also, as seen by the solid line arrows indicating the wave propagation path in FIGS. 2(A) and 2(B), the elements of the first Y-axis reflective array 40a each couple or reflect part of the surface acoustic waves to travel a) from the first Y-axis reflective array 40a outwardly along the negative (−) X-axis direction toward and around the proximate curved connecting surface 20; b) along the positive (+) X-axis direction across the front surface 10 toward and around the opposing curved connecting surface 20; and then c) along the negative (−) X-axis direction to the second Y-axis reflective array 40b on the back surface 15. The elements of the second Y-axis reflective array 40b each transmit the received surface acoustic waves to an adjacent element of the array 40b so that the waves continue traveling along the second Y-axis reflective array 40b along the positive (+) Y-axis direction to the first receiving transducer 35c.

Similarly, the second transmitting transducer 35b generates surface acoustic waves that travel along the negative (−) X-axis direction of the peripheral region 14 of the back surface 15 on which the first X-axis reflective array 40c is situated. The elements of the first X-axis reflective array 40c each transmit part of the surface acoustic waves to an adjacent element of the array 40c. Also, as seen by the solid line arrows indicating the wave propagation path in FIGS. 2(A) and 2(B), the elements of the first X-axis reflective array 40c each couple or reflect part of the surface acoustic waves to travel a) from the first X-axis reflective array 40c outwardly along the negative (−) Y-axis direction toward and around the proximate curved connecting surface 20, b) along the positive (+) Y-axis direction across the front surface 10 toward and around the opposing curved connecting surface 20; and then c) along the negative (−) Y-axis direction to the second X-axis reflective array 40d on the back surface 15. The elements of the second X-axis reflective array 40d each transmit the received surface acoustic waves to an adjacent element of the array 40d so that the waves continue traveling along the second X-axis reflective array 40d along the positive (+) X-axis direction to the second receiving transducer 35d.

A touch of the nominal touch region 13 (optionally including region 14) by an object 30, such as finger or stylus, absorbs a portion of the energy of the surface acoustic waves propagating across the front surface 10 and causes an attenuation of the waves passing through the point of touch. The resulting attenuation is detected by the receiving transducers 35c, 35d as a perturbation in the acoustic signal. The control system processes and analyzes the electrical signals transduced by the receiving transducers 35c, 35d, including those related to waveform perturbations, to detect the touch coordinates and position information. Further, the control system maps the touch coordinates and position information to the appropriate control actions of the user interface shown in the display 25 that is generally placed behind the back surface 15. The acoustic touch sensor 1 thus provides an XY coordinate input device system.

Figure 3:
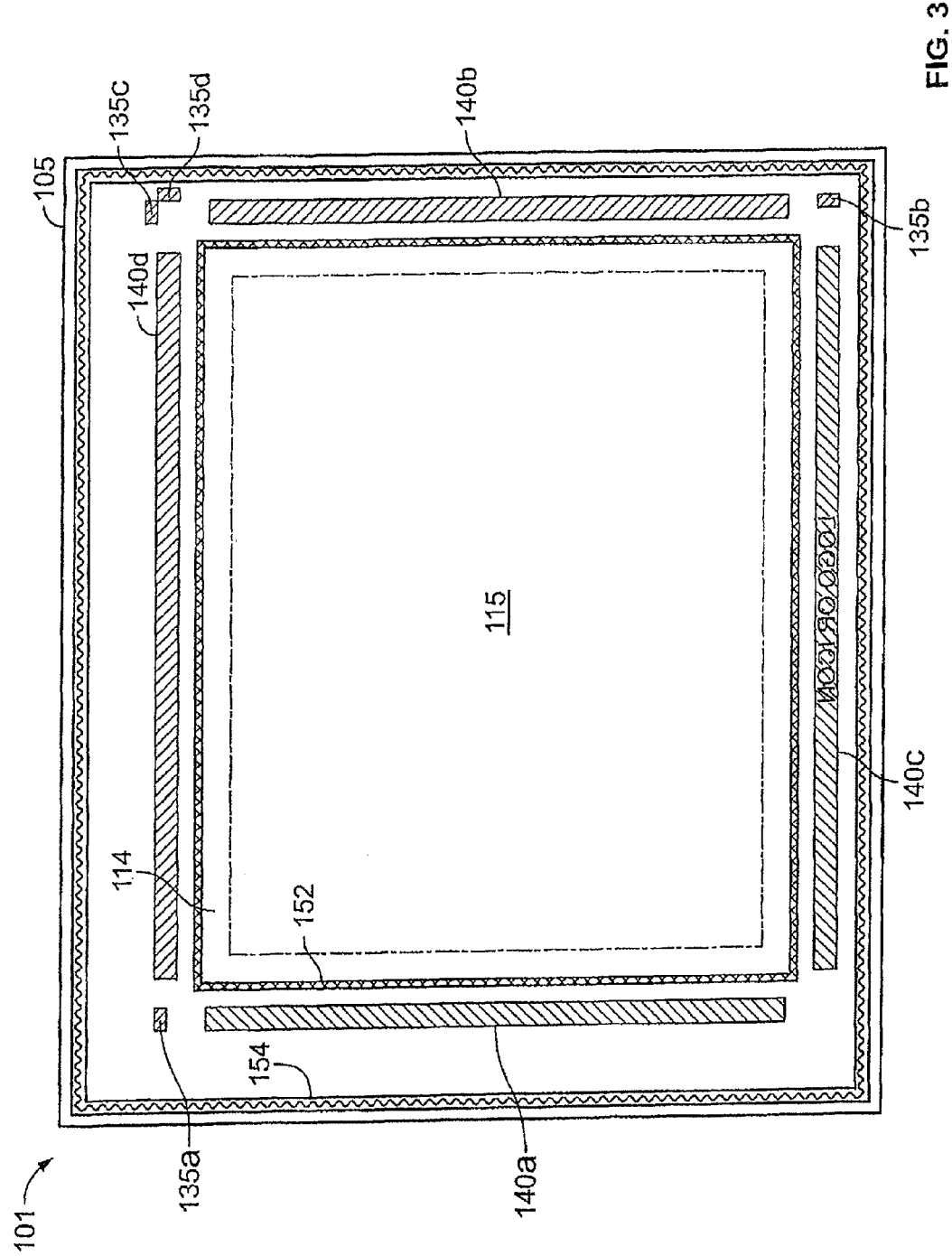
FIG. 3 is a back plan view of the substrate of an acoustic touch sensor with a logo/icon on the substrate.

FIG. 3 is a plan view of a back surface 115 of a substrate 105 of an acoustic touch sensor 101 that has an exemplary logo/icon provided on the substrate 105. As noted above, for a bezel-less acoustic touch sensor 101 that has certain aesthetic considerations, an acoustically benign layer ("border layer") 27 such as an opaque paint or ink (shown in FIG. 1) may be applied (e.g., screen printed, painted, sputtered or otherwise applied) on the peripheral region 114, or border, of the back surface 115. The border layer 27 is acoustically benign, i.e., it propagates surface acoustic waves without rapid attenuation, preferably resulting in only small changes to the surface acoustic wave's velocity of propagation for easier manufacturing control of the wave's velocity despite factional changes in material thickness. The border layer 27 may be an inorganic black paint made of ceramic resin or porcelain enamel types of material. Typically, the border layer 27 will be approximately 10 microns thick, according to a specific embodiment. The periphery functional elements, i.e., the transducers 135 and the reflective arrays 140, are bonded on top of the border layer 27 so that the elements are hidden from view through the substrate 105 which is typically transparent. Other periphery elements are also laid on top of the border layer 27 to be hidden from view, e.g., mounting tape 152, sealing foam 154. The border layer 27 is able to both bond with the substrate 105 and serve as an adequate processing surface for the transducers 135 and the reflective arrays 140 formed thereon. Note that the border layer 27 is not shown in FIG. 3 so as not to obscure the structures but the border layer 27 covers the peripheral region 114, and may extend at least from the edges of the back surface 115 to just beyond the innermost edge of the mounting tape 152.

Figure 4A:
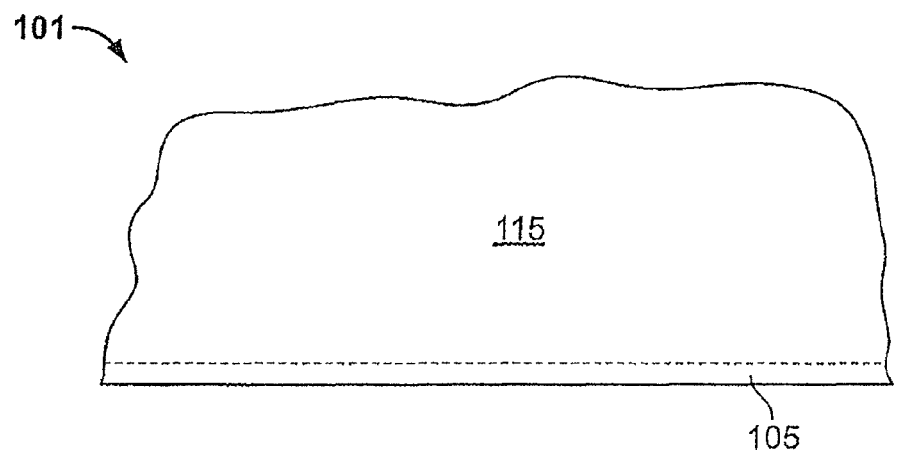
FIG. 4A is a view of a portion of the back surface of the substrate of an acoustic touch sensor prior to the application of a border layer.
Figure 4B:
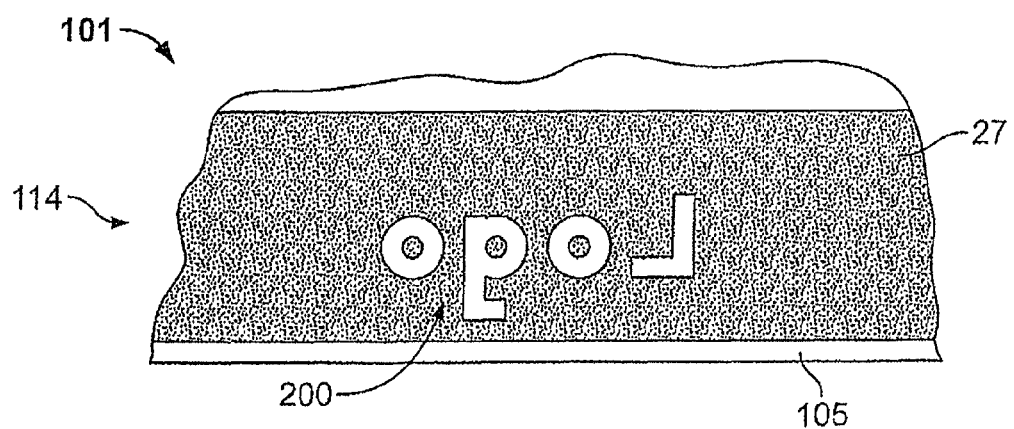
FIG. 4B is a view of the back surface of FIG. 4A after the application of a border layer and a cut-out logo/icon.

The exemplary logo/icon, and the layered material structures around the logo/application icon, is described in more detail with respect to FIGS. 4A through 4E. FIG. 4A shows a portion of the back surface 115 of the substrate 105 of the acoustic touch sensor 101 prior to the application of a border layer and a logo/icon. The dotted line indicates the boundary between the back surface 115 and the curved connecting surface 20 of the substrate 105. FIG. 4B shows that the border layer 27 may be applied on the peripheral region 114, or border, of the back surface 115. However, the border layer 27 is not applied in regions corresponding to the elements and shapes of the logo/icon 200. In this way, the logo/icon 200 is formed by a "negative" process in which the respective elements and shapes are determined by the absence of the ink of the border layer 27. Note, although the present invention is described herein with respect to logos or icons formed by a negative process, the present invention may be applied with minor variations to the case in which the logos and icons may be formed by a positive process in which the respective elements and shapes are provided, such as by printing, directly on the periphery back surface 115 of the substrate 105 underneath the border layer 27. This is described in more detail in FIGS. 10-12.

Figure 4C:
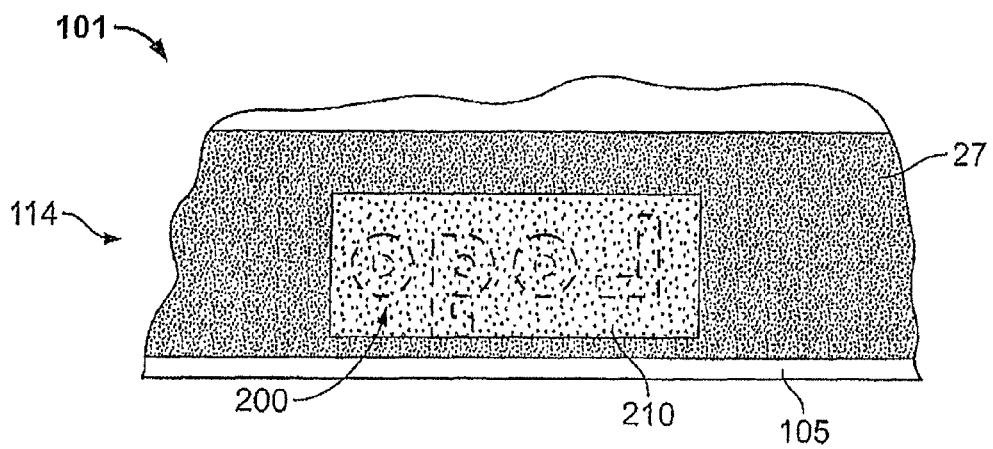
FIG. 4C is a view of the back surface of FIG. 4B after the application of a color patch over the logo/icon.

FIG. 4C shows a color (e.g. silver) patch 210 that is applied (e.g., glazing) over the elements and shapes of the logo/icon 200 and the nearby portion of the border layer 27. The patch 210 may be an inorganic, ceramic ink that provides a simple, cost-effective way to fill the empty elements and shapes of the logo/icon 200 and provides a uniform color for the logo/icon 200. Alternatively, the empty elements and shapes of the logo/icon 200 may be filled in directly with color ink. The patch 210 covers the entire logo/icon 200 but does not have to be perfectly aligned. Typically, the patch 210 will be approximately 30 microns thick.

Figure 4D:
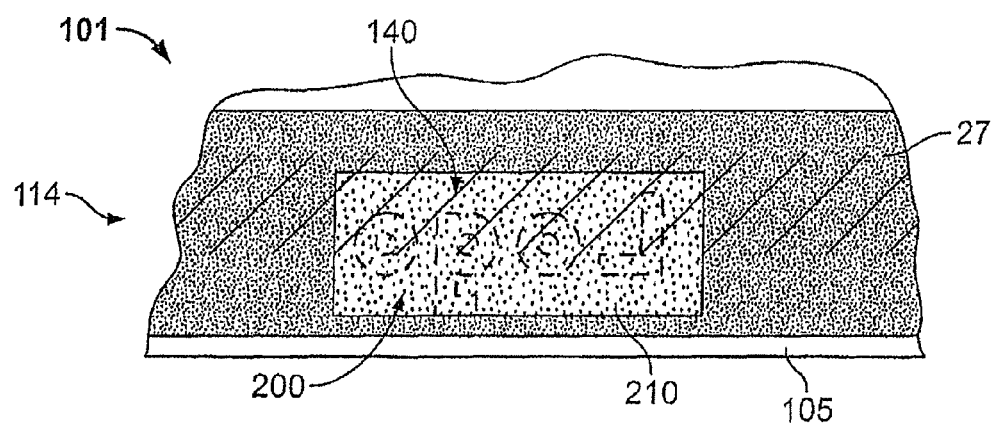
FIG. 4D is a view of the back surface of FIG. 4C after the application of a reflective array over the border layer, the logo/icon, and the color patch.
Figure 4E:
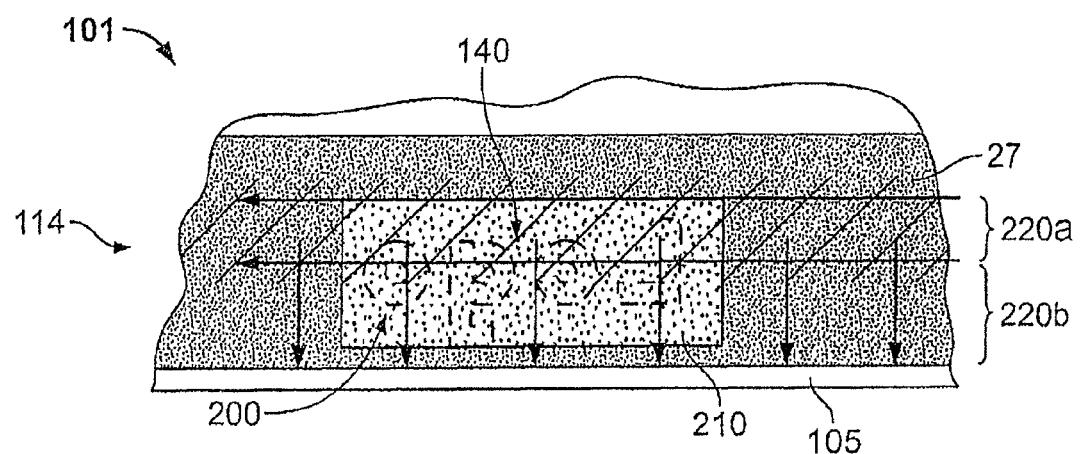
FIG. 4E is a view of the back surface of FIG. 4D and directions of surface acoustic wave propagation.

As shown in FIG. 4D, the reflective arrays 140 are printed on top of the border layer 27 so as to be hidden from view through the substrate 105 which is typically transparent. The reflective arrays 140 may or may not be printed on top of the patch 210. The figure shows the reflective array 140 partially printed on top of the patch 210. In this case, the logo/icon 200 intercepts both the surface acoustic waves along the array 140 axis from (or to) the transducer 135 as well as the scattered surface acoustic waves to (or from) the glass edge 20. FIG. 4E shows sample SAW propagation directions 220a, 220b for the surface acoustic waves along the array 140 axis and for the scattered surface acoustic waves.

Figure 5:
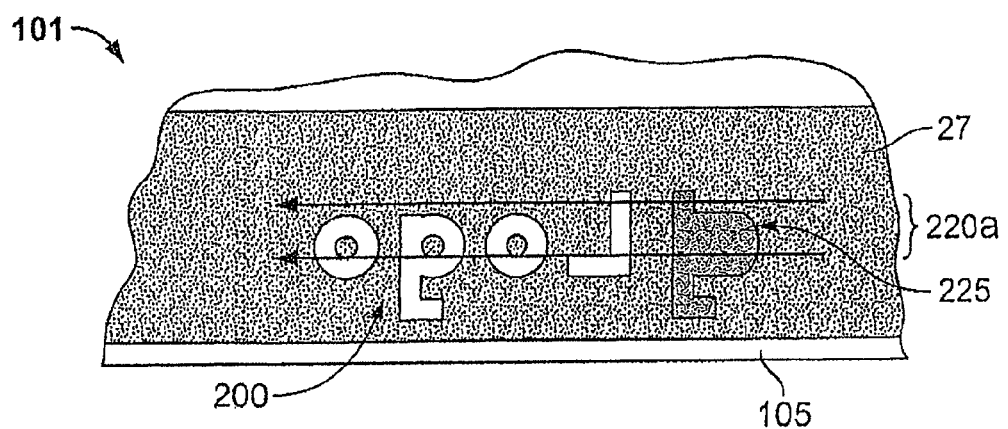
FIG. 5 is a view of the back surface of the substrate of an acoustic touch sensor having a border layer, a cut-out logo/icon, and a compensating frit pattern constructed in accordance with a specific embodiment of the present invention.

As indicated above, the presence of a logo/icon 200 may cause reduced received signals in the acoustic touch sensor 101 due to 1) lens or refraction effects; 2) scattering effects; and 3) phase velocity shift effects on array reflector spacing. The first problem of lens or refraction, for example, due to regions of missing border layer 27 corresponding to logo lettering, may be addressed by considering only the transducer beam energy through the logo/icon 200. This is shown in FIG. 5, where the color patch 210 and the reflector array 140 are present but are not shown for clarity. As noted above, during operation of the touch sensor 101, a depression in the signal past (or downstream) the logo/icon 200 may result due to undesired lensing or refraction of SAW beams passing through the logo/icon 200. This results in changes in the received signal. To compensate for the logo/icon 200 in accordance with the present invention, a pattern of acoustic material (e.g., glass frit) 225 is printed in the neighborhood of the logo/icon 200, either before (as shown), after, or between the elements and shapes of the logo/icon 200. In particular, the phase delays in the added glass frit correction "lens" 225 cancels the phase advance where ink of the border layer 27 is missing in the elements and shapes of the logo/icon 200. In certain circumstances, the frit pattern 225 may appear to largely or entirely eliminate any depression of the signal after the logo/icon 200.

The frit pattern 225 and the reflective array 140 are applied on the back surface 115 after the application of the border layer 27. It may be applied before, after, or at the same time as the application of the color patch 210. The frit pattern 225 may be applied on the back surface 115 by various methods (e.g., screen printed, painted, sputtered, or otherwise applied). The frit pattern 225 may take on any shape, may be placed upstream or downstream of the wave propagation, and may be interspersed with the elements and shapes of the logo/icon 200. The critical characteristic of the frit pattern 225 is the ability to enable the total phase velocity of the surface acoustic waves travelling through the logo/icon 200 to be effectively the same for the different beams of the surface acoustic waves. FIG. 5 shows the frit pattern 225 taking on a shape that is a composite of the elements and shapes of the logo/icon 200 that are downstream. This equalizes the variations in the phase delay of the horizontally-shown propagating SAW paths through the frit pattern 225 and the logo/icon 200.

Figure 6:
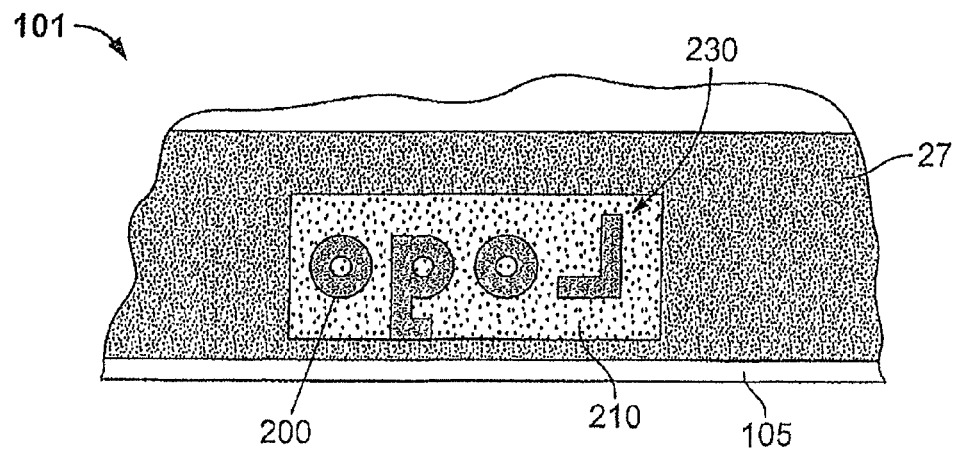
FIG. 6 is a view of the back surface of the substrate of an acoustic touch sensor having a border layer, a cut-out logo/icon, a color patch, and a compensating frit pattern applied over the logo/icon constructed in accordance with a specific embodiment of the present invention.

Alternatively, in the case that the SAW velocity loading effect is the same for the border layer 27 and the frit pattern 225, the frit pattern 230 may be applied on the color patch 210 over the elements or shapes of the logo/icon 200 like a second patch. This is shown in FIG. 6. Note that it is also applied before the application of the reflective array. If the frit pattern 230 has a weaker SAW velocity loading effect, the compensation is partial but still beneficial. If the frit pattern 230 has a stronger SAW velocity loading effect, the effective area average print thickness may be reduced, for example, with a fine mesh pattern for the frit pattern 230. This approach is possible because there are no demanding optical requirements for the logo/icon 200 that would be adversely affected by printed material "within" the logo/icon 200.

Figure 7A:
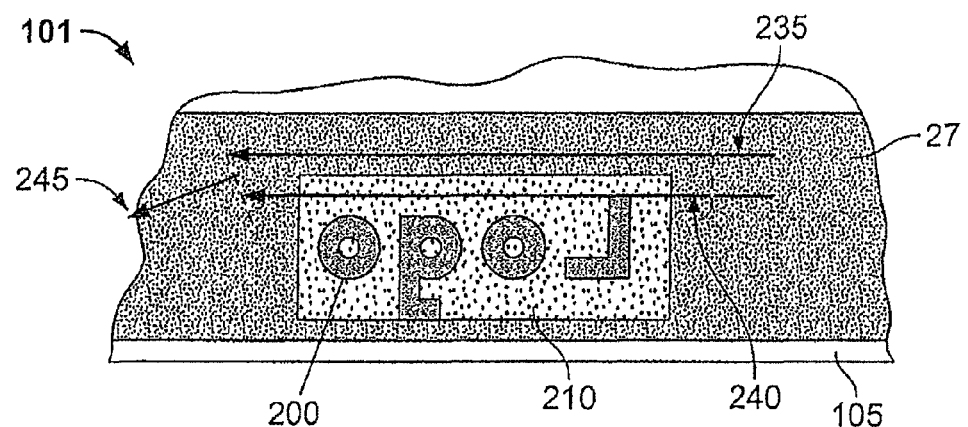
FIG. 7A is a view of the back surface of the substrate of an acoustic touch sensor having a border layer, a cut-out logo/icon, and a color patch and surface acoustic waves transmitted partially through the color patch.
Figure 7B:
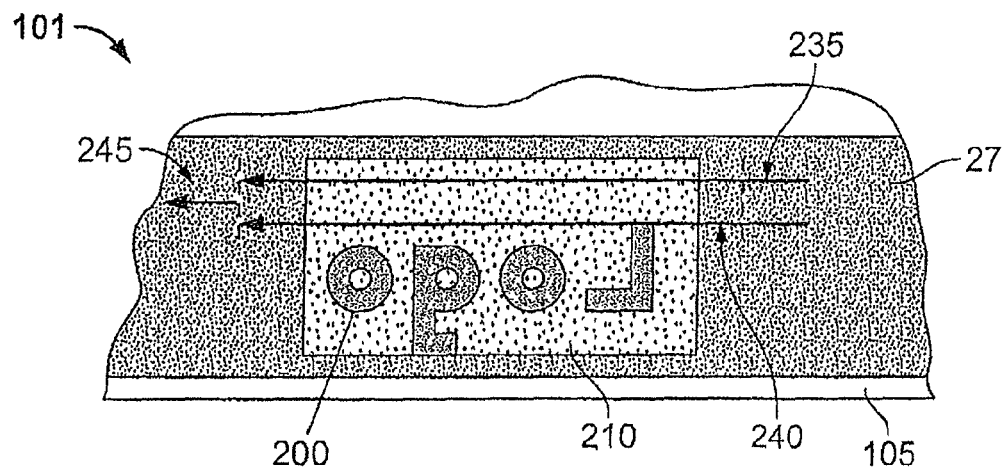
FIG. 7B is a view of the back surface of FIG. 7A with an enlarged color patch constructed in accordance with the present invention and surface acoustic waves transmitted through the enlarged color patch.

The first problem of lens or refraction effects also arises in the case where the surface acoustic waves from the transducer 135 are transmitted through the color patch 210. As illustrated in FIG. 7A, a SAW ray 235 just above the color patch 210 will advance in phase relative to a SAW ray 240 through the color patch 210 due to the phase velocity slowing effects of the color patch 210. This rotation of the equal phase wave front leads to refractive bending 245 of the transmitted SAW beam. As illustrated in FIG. 7B, the simplest approach to address this problem is to increase the width of the color patch 210 to intercept the entire useful width of the transducer SAW beam. In such case, the SAW ray 235 just above the color patch 210 will have the same phase velocity relative to the SAW ray 240 through the color patch 210 and no refractive bending of the transmitted SAW beam occurs. The figure does not show the reflective array (for ease of visualization) but the entire useful width may be at least the width of the reflective array plus some additional space, e.g., two to three mm, on each side. Note that, typically, the edge of the substrate 105 is relatively distant from the reflective array, the logo/icon 200, and the color patch 210 (a few millimeters) so that an enlarged color patch 210 may be accommodated.

Figure 7C:
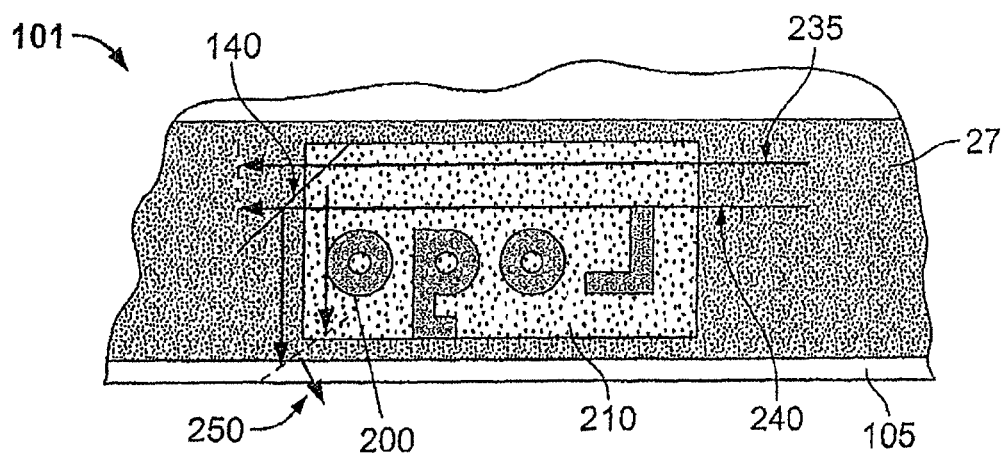
FIG. 7C is a view of the back surface of FIG. 7B and scattered surface acoustic waves transmitted partially through the enlarged color patch.
Figure 7D:
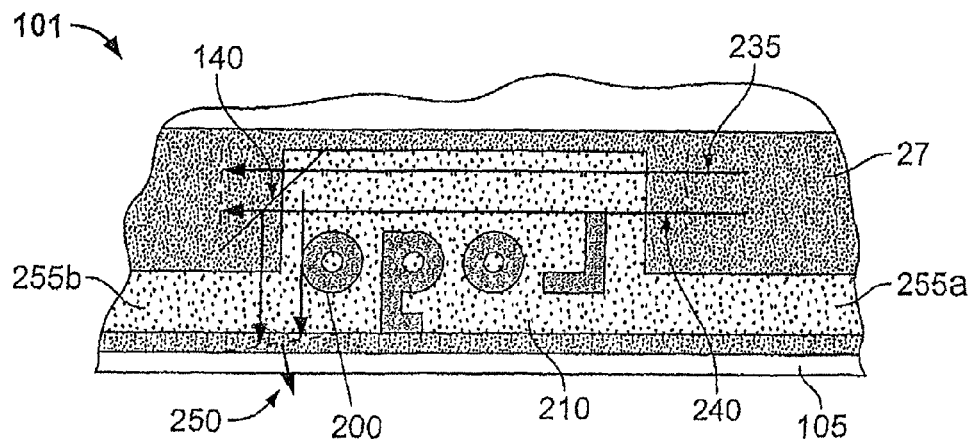
FIG. 7D is a view of the back surface of FIG. 7B with a reconfigured color patch constructed in accordance with a specific embodiment of the present invention and scattered surface acoustic waves transmitted partially through the reconfigured color patch.

FIG. 7C is a view of the back surface of FIG. 7B and scattered surface acoustic waves transmitted partially through the enlarged color patch 210. More particularly, the SAW rays 235, 240 transmitted from the transducer (not shown) propagate horizontally through the enlarged color patch 210 with the same phase velocity. However, the SAW rays 235, 240 are partially reflected or scattered by the reflective array 140 to propagate vertically. In the figure, the phase of the scattered SAW ray 235 in the color patch 210 is slowed relative to the scattered SAW ray 240 outside of the color patch 210, leading to refractive SAW deflection 250. If there is sufficient space between the edge of the substrate 105 and the SAW beam transmitted parallel to the array axis (i.e., transmitted from the transducer), the refractive SAW deflection 250 may be partially compensated by a reconfigured color patch 210 that provides extra printed material 255a, 255b parallel to the substrate 105 edge to partially intercept the scattered SAW ray 240. This is shown in FIG. 7D. This will have the effect of slowing down the scattered SAW ray 240 relative to the phase velocity of the scattered SAW ray 235 in the color patch 210 and partially correcting the refractive SAW deflection 250. The extensions 255a, 255b of the reconfigured color patch 210 parallel to the substrate 105 edge may be gradually tapered (e.g., formed V-shaped) so that they do not need to extend the entire length of the edge.

Figure 7E:
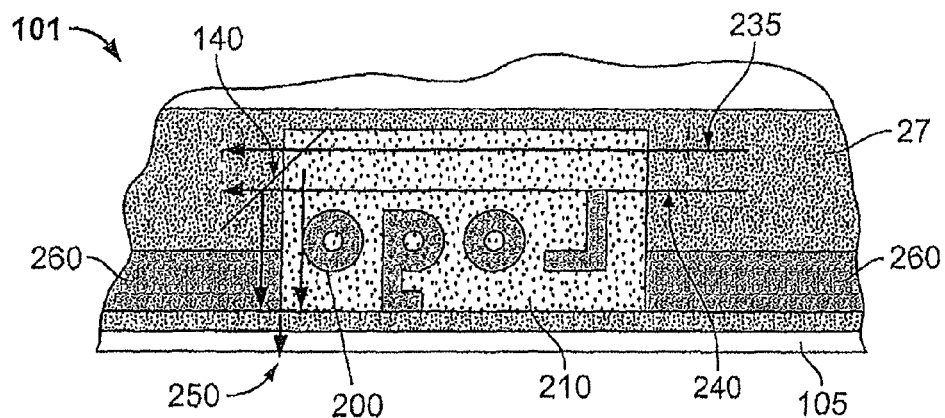
FIG. 7E is a view of the back surface of FIG. 7B with a compensating frit layer constructed in accordance with the present invention and scattered surface acoustic waves transmitted partially through the frit layer.

Stronger phase compensation for the scattered SAW ray 235 is possible with the addition of a frit layer 260 printed on top of or underneath the reconfigured color patch 210 extensions 255a, 255b. This is shown in FIG. 7E. Alternatively, the frit layer may be used in lieu of the reconfigured color patch 210 extensions 255a, 255b. The frit layer 260 also may be gradually tapered (e.g., formed V-shaped) so it does not need to extend the entire length of the substrate 105 edge. Regardless of the configuration, the frit layer may be formed to equalize the phase velocities of the SAW rays 235, 240 to eliminate the refractive SAW deflection 250.

Figure 8:
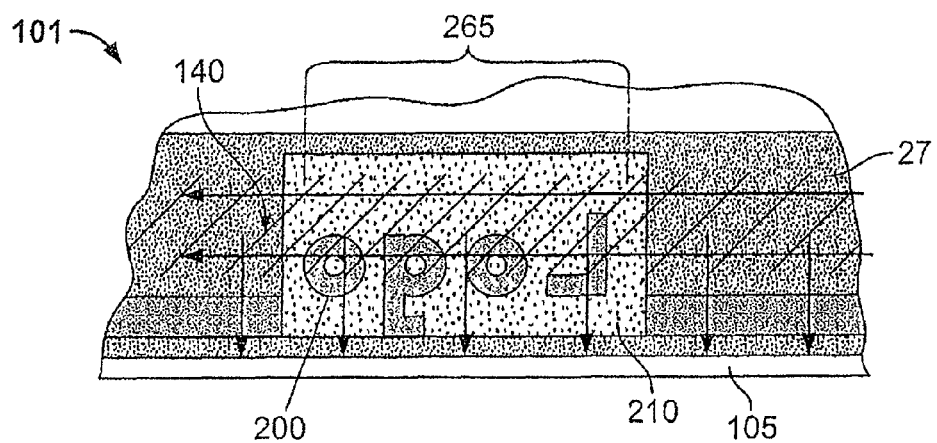
FIG. 8 is a view of the back surface of the substrate of an acoustic touch sensor having a reflective array design constructed in accordance with a specific embodiment of the present invention.

The present invention also addresses the problem of the undesired effects of phase velocity shifts, caused by the presence of the logo/icon 200, on reflective array spacing. Ideally, reflective arrays are spaced at integral multiples of the SAW wavelength. For a given operating frequency of the acoustic touch sensor 101, the SAW wavelength is equal to the SAW phase velocity divided by the operating frequency. So when the phase velocity of a SAW beam changes, the SAW wavelength also changes. As described above, the color patch 210 for the logo/icon 200 decreases the phase velocity of SAW beams propagating through the color patch 210 and, consequently, locally reduces the SAW wavelength. If the reflector array spacing is not modified to compensate for the reduced SAW phase velocity, and hence reduced SAW wavelength, array reflection will become less coherent resulting in a dip in the received signal corresponding to the width of the color patch 210. As shown in FIG. 8, the present invention provides a reflective array 140 design that may compensate for this adverse effect with a decrease in array 140 spacing within the color patch 210 (e.g., by the addition of reflective array elements 265) to maintain a spacing equal to an integral number of SAW wavelengths. It is noted, for visual clarity, FIG. 8 greatly exaggerates the change in reflective array 140 spacing; in actual acoustic touch sensor 101 designs, the change in reflective array 140 spacing will be on the order of 1% or less.

Figure 9:
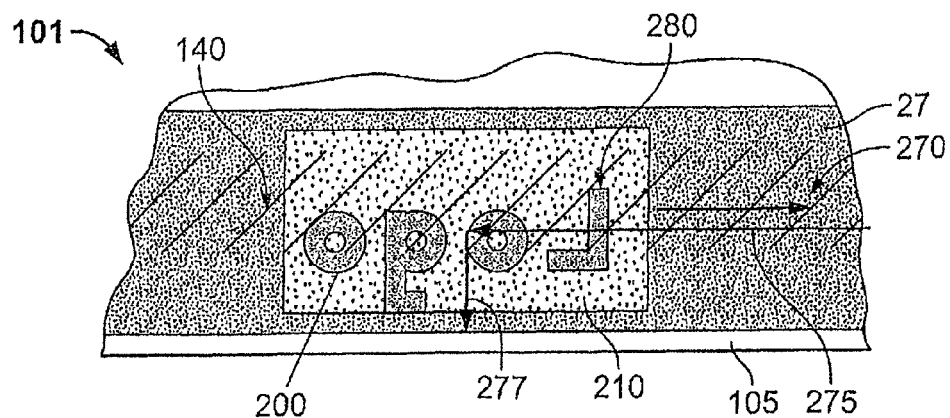
FIG. 9 is a view of the back surface of the substrate of an acoustic touch sensor having a compensating frit pattern constructed in accordance with a specific embodiment of the present invention.

The present invention also addresses the undesired effect that the logo/icon 200 itself or the color patch 210 may be a source of undesired SAW reflections and subsequent parasitic received signals. As illustrated in FIG. 9, a horizontal arrow 270 represents a reflection of a transmitting transducer's SAW beam 275 off the leading vertical edge of the color patch 210. This reflection is not of serious concern as the small amount of reflected SAW energy in this case is unlikely to make it to the receiving transducer (not shown) and create a parasitic signal. A vertical arrow 277 represents a 90° SAW beam scattering off the portion of the outline of the logo/icon 200 letter "o" that is at 45° (instead of scattering off one of the reflective array 140 elements). This is of more serious concern as the scattered beam may follow an acoustic path to the receiving transducer. The present invention provides an opposite phase (180°) reflection in the same direction to counteract the errant scattering via destructive interference. Specifically, a frit pattern 280 may be applied on the color patch 210 over the elements or shapes of the logo/icon 200, like a second patch, but before the application of the reflective array 140. The frit pattern 280 must be aligned with the elements or shapes of the logo/icon 200 (e.g., within 100 microns, or other small fraction of a wavelength) to maximize its compensating effect. In such case, the frit pattern 280 significantly reduces or eliminates the undesired reflection. Note that, in many cases, such logo/icon 200 reflections may be present but at too low of a level to cause significant degradation in acoustic touch sensor performance. Also, modifications to the location or form of the elements or shapes of the logo/icon 200 may assist in minimizing undesired signal effects in combination with the present invention, or alone.

Figure 10A:
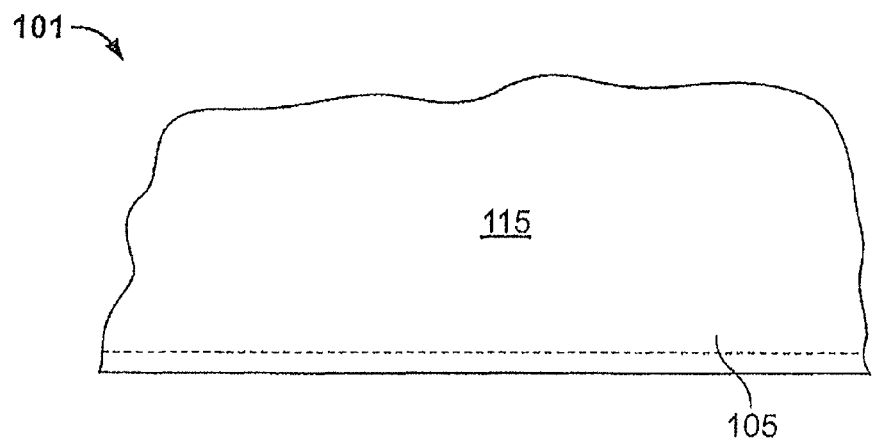
FIG. 10A is a view of a portion of the back surface of the substrate of an acoustic touch sensor.
Figure 10B:
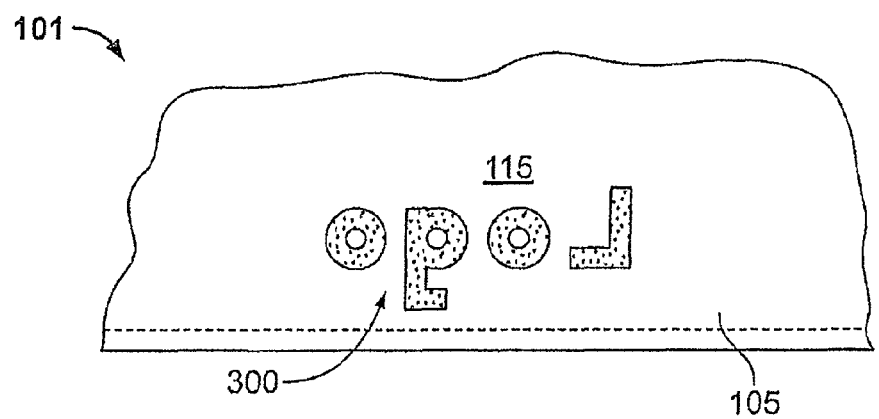
FIG. 10B is a view of the back surface of FIG. 10A after the application of a logo/icon.
Figure 10C:
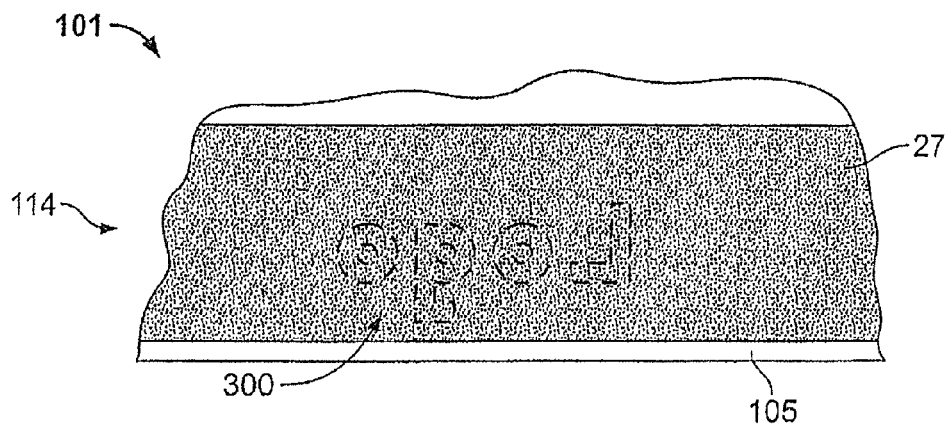
FIG. 10C is a view of the back surface of FIG. 10B after the application of a border layer over the logo/icon.

As noted above, the present invention may be applied with minor variations to the case in which the logos and icons may be formed by a "positive" process in which the respective elements and shapes are provided, such as by printing, directly on the periphery of the back surface 115 of the substrate 105 underneath the border layer 27. The acoustic touch sensor 101 with an exemplary positive logo/icon 300 fabricated on the back surface 115 of the substrate 105 is described in more detail in FIGS. 10-12. FIG. 10A is a view of a portion of the back surface 115 of the substrate 105 of the acoustic touch sensor 101. The dotted line indicates the boundary between the back surface 115 and the curved connecting surface 20 of the substrate 105. FIG. 10B is a view of the back surface 115 after the application of an exemplary logo/icon 300 on the substrate 105. FIG. 10C is a view of the back surface 115 after the application of a border layer 27 over the peripheral region 114 of the back surface 115, including the logo/icon 300. This permits the logo/icon 300 (also referred to as printed material 300) to be seen through the substrate 105 which is typically transparent. The printed material 300 is acoustically benign like the border layer 27 and may be made of similar materials (although of different pigmentations so as to be distinguished). The printed material 300 may be applied on the back surface 115 by various methods (e.g., screen printed, painted, sputtered, or otherwise applied). Typically, the printed material 300 has more layers of ink than the border layer 27.

Figure 10D:
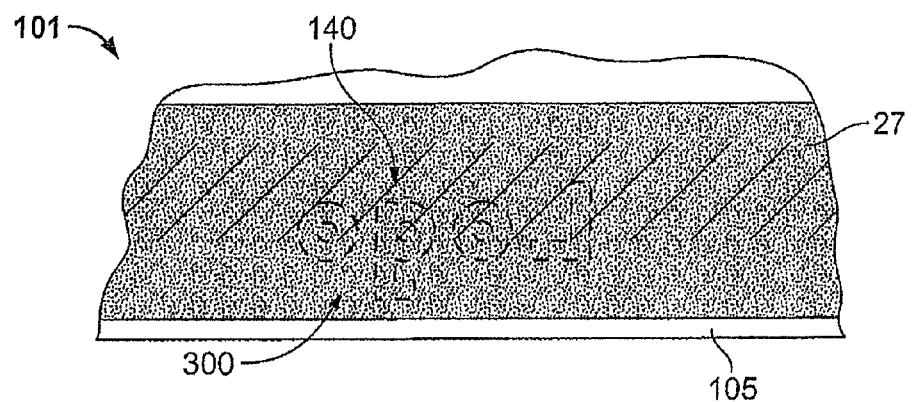
FIG. 10D is a view of the back surface of FIG. 10C after the application of a reflective array over the border layer and the logo/icon.
Figure 10E:
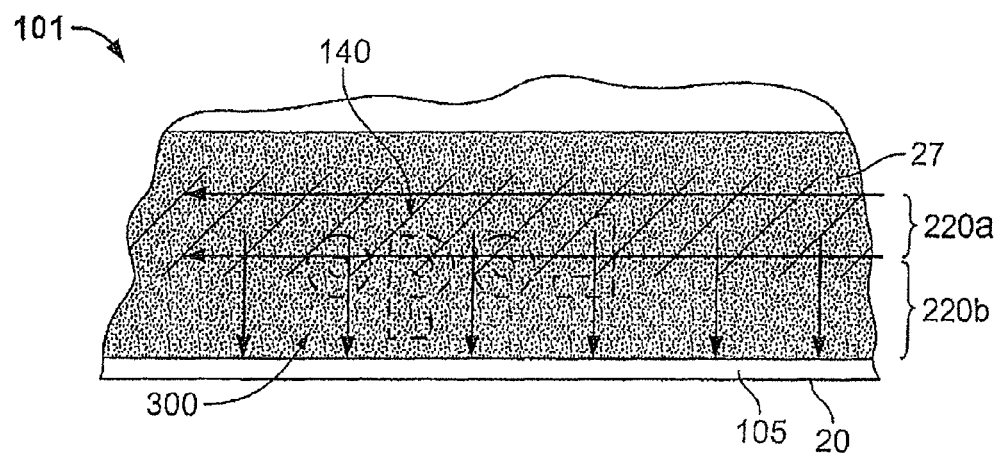
FIG. 10E is a view of the back surface of FIG. 10D and directions of surface acoustic wave propagation.

As shown in FIG. 10D, the reflective arrays 140 are printed on top of the border layer 27 so as to be hidden from view through the substrate 105. The reflective arrays 140 may or may not be printed above the logo/icon 300. The figure shows the reflective array 140 partially printed above the logo/icon 300. In this case, the logo/icon 300 intercepts both the surface acoustic waves along the array 140 axis from (or to) the transducer 135 (not shown) as well as the scattered surface acoustic waves to (or from) the glass edge 20. FIG. 10E shows sample SAW propagation directions 220a, 220b for the surface acoustic waves along the array 140 axis and for the scattered surface acoustic waves.

Figure 11:
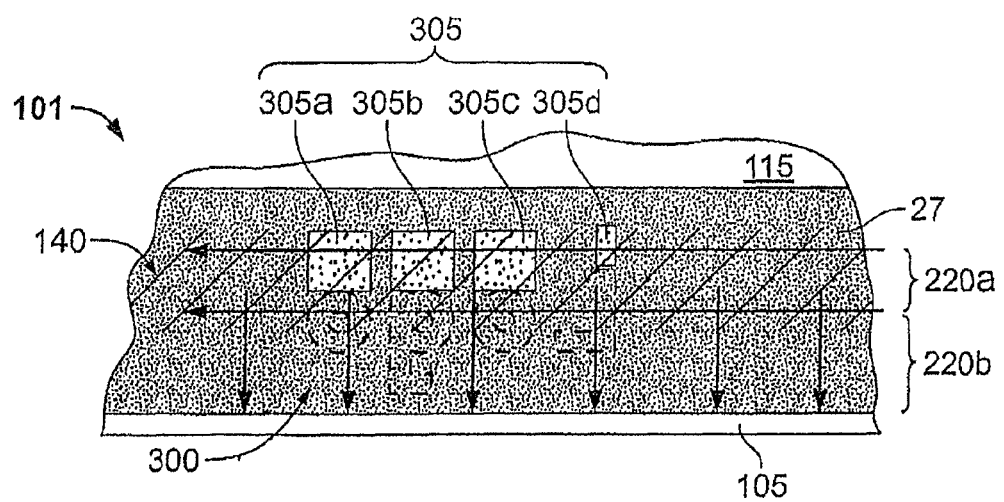
FIG. 11 is a view of the back surface of FIG. 10E having a compensating pattern constructed in accordance with a specific embodiment of the present invention.

Like a logo/icon fabricated with a negative process, the presence of a logo/icon 300 fabricated with a positive process may cause reduced received signals in the acoustic touch sensor 101 due to 1) lens or refraction effects; 2) scattering effects; and 3) phase velocity shift effects on array reflector spacing. The present invention provides similar solutions to those applied above to correct for a logo/icon formed with a negative process. FIG. 11 is a view of the back surface 115 of the substrate 105 having a compensating pattern 305, constructed in accordance with the present invention, to compensate for the logo/icon 300. The compensating pattern 305 comprises a pattern of acoustic material (e.g., glass frit or material similar to the material of the logo/icon 300) that is printed next to the logo/icon 300 to enable phase velocity changes of the transmitted SAW 220a through the logo/icon 300. In particular, the phase delays in the added compensating pattern 305 cancel the phase advance where ink of the border layer 27 doesn't overlie the elements and shapes of the logo/icon 200. In certain circumstances, the compensating pattern 305 may appear to entirely eliminate any phase shifting (and signal dipping) of the received signal.

The compensating pattern 305 is shown comprising multiple segments 305a, 305b, 305c, 305d, each of which are positioned adjacently above a respective element or shape of the logo/icon 300. Each segment also has a width that roughly corresponds to the width of the respective element or shape of the logo/icon 300. The compensating pattern 305 may be applied before or after the application of the border layer 27 and, alternatively, may be applied at the same time as the reflective array 140. The compensating pattern 305 may be applied by various methods (e.g., screen printed, painted, sputtered, or otherwise applied). The compensating pattern 305 may take on any shape (although shown as rectangular as well as segmented), may be placed upstream or downstream of the wave propagation, and may be interspersed with the elements and shapes of the logo/icon 300 (as shown). The critical characteristic of the compensating pattern 305 is the ability to enable the total phase advance of the surface acoustic waves travelling through the logo/icon 300 to be effectively the same for the different beams of the surface acoustic waves. FIG. 11 shows the compensating pattern 305 taking on an interspersed, segmented form that approximates the forms of the elements and shapes of the logo/icon 300. This equalizes the variations in the phase delay of the horizontally-shown propagating SAW paths 220a through the compensating pattern 305 and the logo/icon 300.

Figure 12:
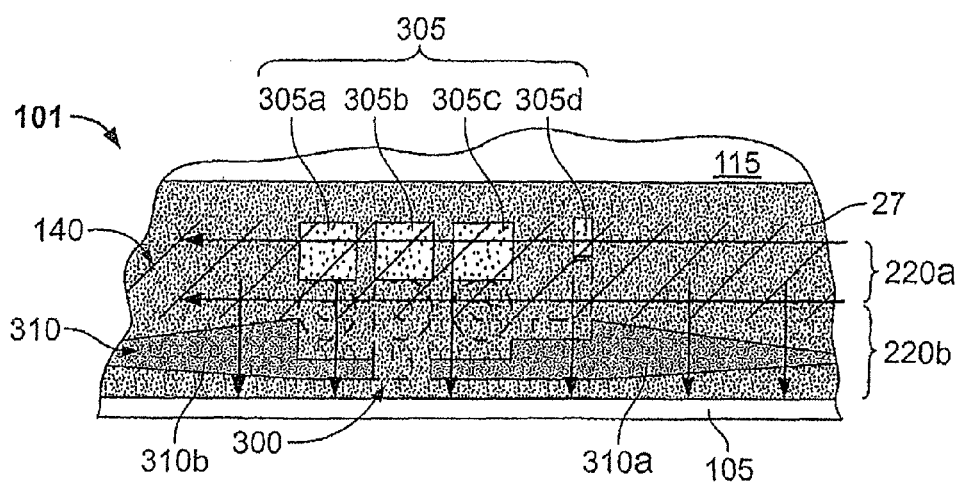
FIG. 12 is a view of the back surface of FIG. 11 having an additional compensating pattern constructed in accordance with a specific embodiment of the present invention.

While FIG. 11 shows a compensating pattern 305 that equalizes phase shifts of horizontal (i.e., transmitted) SAW beams as a function of height (or the vertical coordinate), FIG. 12 shows an additional compensating pattern 310 that equalizes phase shifts of vertical (i.e., scattered) SAW beams through the logo/icon 300 as a function of the horizontal coordinate. The compensating pattern 310 comprises a pattern of acoustic material (e.g., glass frit or material similar to the material of the logo/icon 300) that is printed next to the logo/icon 300 to enable phase velocity changes of the scattered SAW 220b through the logo/icon 300. In particular, the phase delays in the added compensating pattern 310 cancel the phase advance where ink of the border layer 27 doesn't overlie the elements and shapes of the logo/icon 200. Like the first compensating pattern 305, in certain circumstances, the compensating pattern 310 may appear to entirely eliminate any phase shifting (and signal dipping) of the received signal.

The compensating pattern 310 is shown comprising two segments 310a, 310b, each of which is positioned adjacently below certain of the elements or shapes of the logo/icon 300. Each segment also has a vertical profile that roughly equalizes the vertical profiles of the respective element or shape of the logo/icon 300. The compensating pattern 310 may be applied before or after the application of the border layer 27 and, alternatively, may be applied at the same time as the reflective array 140. The compensating pattern 310 may be applied by various methods (e.g., screen printed, painted, sputtered, or otherwise applied). The compensating pattern 310 may take on any shape, may be placed upstream or downstream of the wave propagation, and may be interspersed with the elements and shapes of the logo/icon 300. The critical characteristic of the compensating pattern 310, like the first compensating pattern 305, is the ability to enable the total phase advance of the surface acoustic waves travelling through the logo/icon 300 to be effectively the same for the different beams of the surface acoustic waves. As noted above, FIG. 12 shows the compensating pattern 310 taking on a segmented form that roughly equalizes the vertical profiles of the respective element or shape of the logo/icon 300. This equalizes the variations in the phase delay of the vertically-shown propagating SAW paths 220b through the compensating pattern 310 and the logo/icon 300. Note that a segment 310a, 310b of the compensating pattern 310 may extend, and be tapered (e.g., formed V-shaped), beyond the horizontal position of the logo/icon 300. This provides a gradual change in phase shifting of the vertical (i.e., scattered) SAW beams 220b through the logo/icon 300 relative to the surrounding border layer 27.

Figure 13:
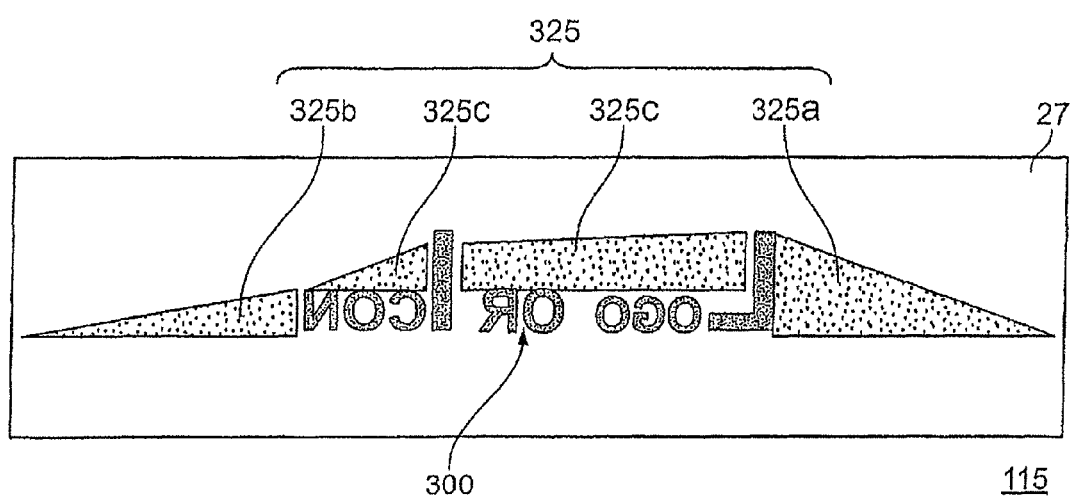
FIG. 13 is a view of a portion of the back surface of the substrate of an acoustic touch sensor having a compensating pattern constructed in accordance with a specific embodiment of the present invention.

Although the placement and form of either compensating pattern 305, 310 are not critical factors to enable a gradual phase change of the received signal as desired, each may be adjusted to optimize compensation. Since each logo or application icon is different than the next, the placement and form of the compensating pattern 305, 310 may be adapted to meet the form of the logo or application icon. There are, however, general optimization techniques, that are generally shown in FIG. 13. For example, the compensating pattern 325, and each of its segments 325a, 325b, 325c, generally should be minimally displaced from the elements and shapes of the logo/icon 300. Also, leading and trailing segments 325a, 325b may have graded dimensions (in three directions) that are directed to a gradual phase change of the received signal. Also, the compensating pattern 325 may be segmented to permit a closer matching with the respective elements and shapes of the logo/icon 300 (for example, by using interspersed segments 325c). However, for various reasons, it may not be possible to precisely follow any of the techniques. In such case, the techniques may be adjusted to suit the particular circumstance.

Figure 14A:
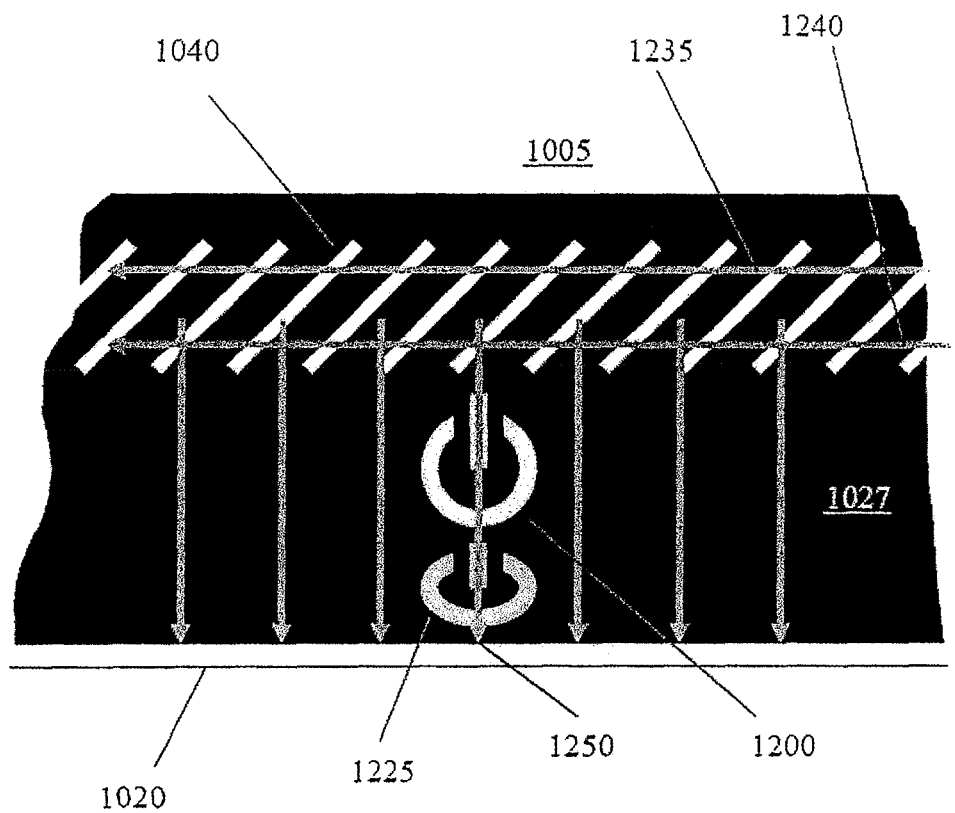
FIG. 14A is a view of a portion of the back surface of the substrate of an acoustic touch sensor having a compensating pattern constructed in accordance with another specific embodiment of the present invention.
Figure 14B:
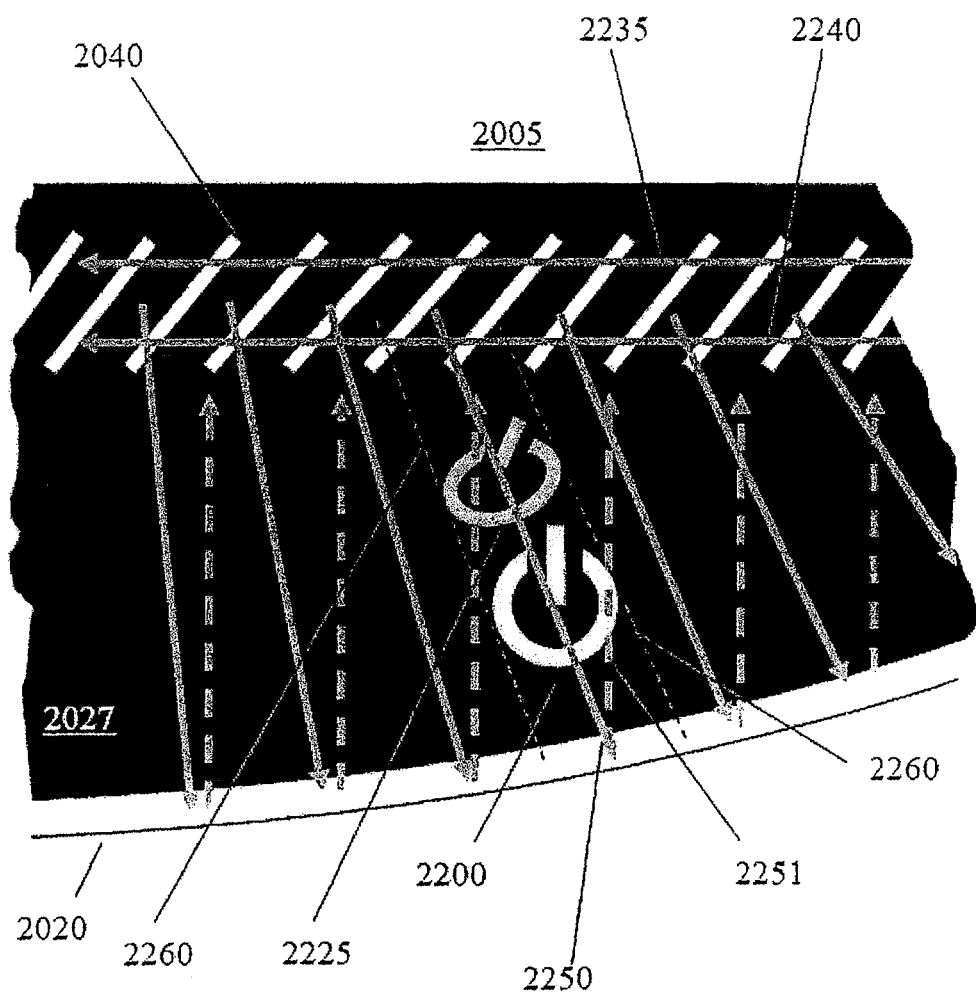
FIG. 14B is a view of a portion of the back surface of the substrate of an acoustic touch sensor having a compensating pattern constructed in accordance with yet another specific embodiment of the present invention.
Figure 14C:
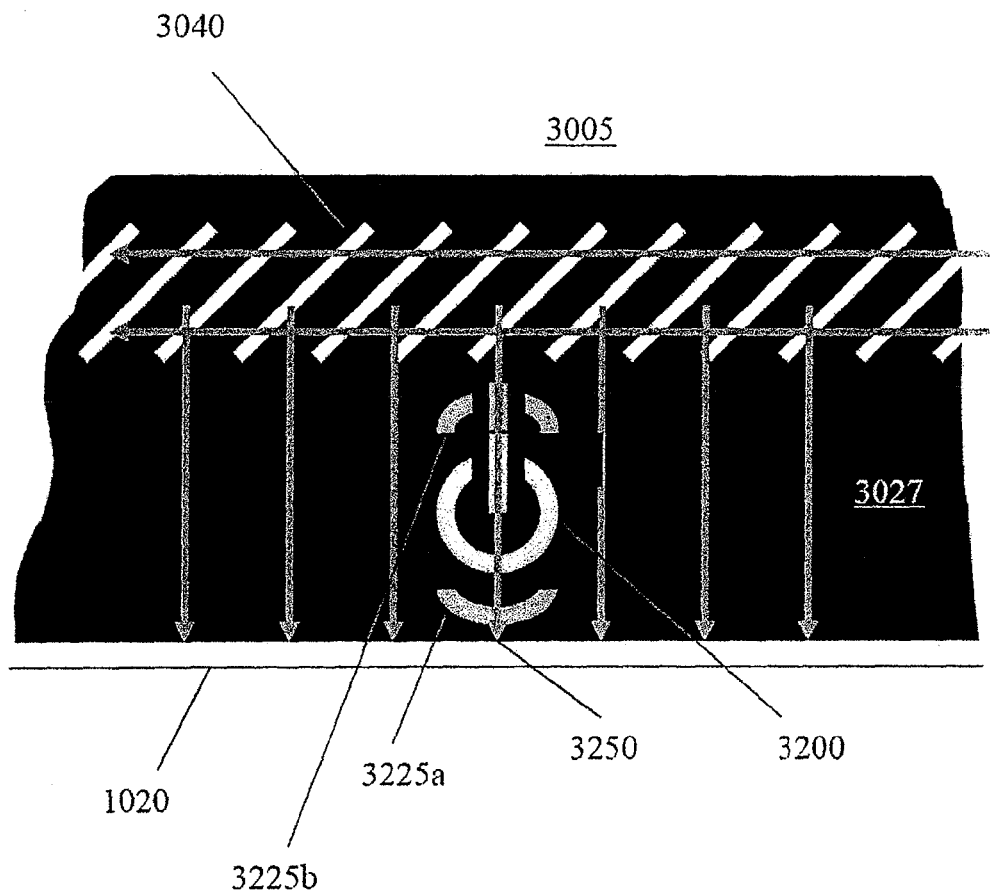
FIG. 14C is a view of a portion of the back surface of the substrate of an acoustic touch sensor having a split compensating pattern constructed in accordance with another specific embodiment of the present invention.

As illustrated in FIGS. 14A, 14B and 14C, when a logo/icon is placed entirely outside a reflective array, and furthermore there is additional room for compensating patterns outside of the arrays, an alternate method may be used to design the compensating pattern. Referring to FIG. 14A, border layer 1027 on substrate 1005 with rounded connecting surface 1020 includes a logo/icon 1200 in which border layer 1027 is absent. Reflective array 1040, and associated SAW rays such as SAW ray 1235 and SAW ray 1240, do not overlap logo/icon 1200 and furthermore there is space available between reflective array 1040 and rounded connecting surface 1020 in which to add a compensating frit pattern 1225. Compensating frit pattern 1225 prevents undesired deflections of SAW rays scattered by reflective array 1040 by the logo/icon 1200 via assuring no net phase perturbation of SAW rays such as SAW ray 1250 passing through the logo/icon 1200. For this purpose, the geometry of the frit compensation pattern 1225 may be a copy of the geometry of the logo/icon 1200 with a compression (as shown) or dilation to account for the difference in phase velocity shifts due to the material coating of the border layer 1027 and the material coating of the frit compensation pattern 1225. In particular, if $V_0$ is the SAW phase velocity of a bare surface of substrate 1005, $V_1$ is the SAW phase velocity where substrate 1005 is coated with border layer 1027, and $V_2$ is the SAW phase velocity where substrate 1005 is coated with border layer 1027 and also frit of the compensating pattern 1225, then the compensation pattern 1225 is magnified in the direction of SAW wave propagation through the logo/icon 1200 by a factor given by the following formula.

$$\text{Magnification factor} = (V_2/V_0)\cdot(V_0-V_1)/V_1-V_2)$$

If the magnification factor is one, the geometry of the frit compensation pattern 1225 is identical to the geometry of the logo/icon 1200. If the magnification factor is greater than one, the frit compensation pattern 1225 is expanded (not shown) and if the magnification factor is less than one, the frit compensation pattern 1225 is compressed as shown in FIG. 14A. Advantageously, the detailed geometry of frit compensation pattern 1225 may be determined from the geometry of icon/logo 1200 and SAW velocity data.

FIG. 14B illustrates a generalization of the principles of FIG. 14A to the case where the substrate edge is not parallel to reflective array and furthermore may be gently curved. Border layer 2027 on substrate 2005 with rounded connecting surface 2020 includes a logo/icon 2200 in which border layer 2027 is absent. Reflective array 2040, and associated SAW rays such as SAW ray 2235 and SAW ray 2240, do not overlap logo/icon 2200 and furthermore there is space available between reflective array 2040 and rounded connecting surface 2020 in which to add a compensating frit pattern 2225. Compensating frit pattern 2225 prevents undesired deflections of SAW rays scattered by reflective array 2040 by the logo/icon 2200 via assuring no net phase perturbation of SAW rays such as SAW ray 2250 passing through the logo/icon 2200. The geometry of the frit compensation pattern 1225 may be a copy of the geometry of the logo/icon 1200 with a compression (as shown) or dilation to account for the difference in phase velocity shifts due to the material coating of the border layer 2027 and the material coating of the frit compensation pattern 2225. The compression or dilation of the frit compensation pattern is in the propagation direction of SAW passing through the logo/icon, for example SAW ray 2250, but unlike the embodiment of FIG. 14A, and as indicated by dashed lines 2260, the SAW propagation direction is no longer in a vertical direction. Non-vertical SAW rays such as SAW ray 2250 may be desirable on the back surface of substrate 2005 when the rounded connecting surface 2020 is curved and not parallel to reflective array 2040 so that on the front touch surface of substrate 2005 the SAW rays, such as SAW ray 2251 (indicated with dashed lines) are vertical.

FIG. 14C illustrates the use of a split compensation pattern for cases where there is insufficient room for the complete compensation pattern above the icon or below the icon (unlike the embodiment of FIG. 14A). In the embodiment of FIG. 14C, there is insufficient room for a complete frit compensation pattern within border layer 3027 on substrate 3005 between logo/icon 3200 and rounded connecting surface 3020. There is also insufficient room for a complete frit compensation pattern between reflective array 3040 and logo/icon 3200. In such a case, the compensation pattern may be split into a lower compensation pattern portion 3225*a* and an upper compensation pattern portion 3225*b* as shown in FIG. 14C. Lower compensation pattern portion 3225*a* and an upper compensation pattern portion 3225*b* together prevent undesired deflections of SAW rays scattered by reflective array 3040 by the logo/icon 3200 via assuring no net phase perturbation of SAW rays such as SAW ray 3250 passing through the logo/icon 3200. Where possible, such split compensation patterns may be desirable to minimize the distance between corresponding points in the logo/icon pattern and the compensation pattern.

Advantageously, as described with the above embodiments, the present invention provides acoustic touch sensors that have corrective structures for transmitted SAW rays propagating parallel to the array axis through a logo/icon as well as for scattered SAW rays propagating perpendicular to the array axis through the logo/icon, i.e., acoustic touch sensors that provide correction for logo/icon phase shifts simultaneously to two different directions of SAW propagation.

Other modifications are possible within the scope of the invention. For example, in each embodiment described, the acoustic touch sensor 101 may have the reflective arrays 140 and the logo/icon 200, 300 (and the color patch 210) well separated. In this case, the logo/icon 200, 300 (and the color patch 210) intercepts only the scattered surface acoustic waves to (or from) the glass edge 20. Then, the acoustic touch sensor 101 only equalizes or avoids rapid variations in phase delay of vertically propagating SAW paths as a function of the horizontal coordinate (or position of the SAW path). This may be accomplished using any of the appropriate correction elements described above, for example, the frit patterns 225, 230; the extensions 255*a*, 255*b* of the reconfigured color patch 210; the frit pattern 280; or the compensating pattern 310.

The invention claimed is:

1. An acoustic touch apparatus, comprising:
a substrate having surfaces configured to propagate surface acoustic waves;
at least one acoustic wave transducer on a first surface; and
at least one reflective array on the first surface, said transducer configured to at least transmit or receive surface acoustic waves to or from the reflective array and said reflective array configured to acoustically couple surface acoustic waves to propagate between surfaces of the substrate, and said substrate having a first acoustic element disposed on the first surface that is configured to intercept propagating surface acoustic waves on the first surface and is configured to cause variations in the phase velocity of the propagating surface acoustic waves and a second acoustic element disposed on the first surface to equalize the variations, wherein the second acoustic element is formed with a shape that is a compensating pattern of the first acoustic element.

2. The apparatus of claim 1, wherein the second acoustic element is configured to cancel out the phase advance or delay of any portion of the propagating surface acoustic waves intercepted by the first acoustic element.

3. The apparatus of claim 1, wherein the second acoustic element is disposed on the first surface in proximity to the first acoustic element.

4. The apparatus of claim 1, wherein the second acoustic element is disposed on the first surface as physically close as possible to the first acoustic element.

5. The apparatus of claim 1, wherein the second acoustic element is configured to intercept propagating surface acoustic waves intercepted by the first acoustic element.

6. The apparatus of claim 5, wherein the second acoustic element is configured to intercept propagating surface acoustic waves parallel to the propagating surface acoustic waves intercepted by the first acoustic element.

7. The apparatus of claim 5, wherein the second acoustic element counteracts the phase advance of any portion of the propagating surface acoustic waves intercepted by the first acoustic element.

8. The apparatus of claim 6, wherein the second acoustic element counteracts the phase advance of a portion of the propagating surface acoustic waves parallel to the propagating surface acoustic waves intercepted by the first acoustic element.

9. The apparatus of claim 1, wherein the first acoustic element comprises a patch of acoustic material applied over a cut-out of a layer of acoustically benign material applied along a border of the first surface.

10. The apparatus of claim 9, wherein the layer of acoustically benign material comprises a first opaque ink and the patch of acoustic material comprises a second opaque ink having different visual properties than the first opaque ink.

11. The apparatus of claim 9, wherein the second acoustic element comprises acoustic material disposed adjacent the cut-out over the layer of acoustically benign material applied along the border of the first surface and either over or under the patch.

12. The apparatus of claim 9, wherein the second acoustic element comprises acoustic material disposed on the patch over the cut-out.

13. The apparatus of claim 9, wherein the reflective array is disposed over the layer of acoustically benign material along the border of the first surface and at least a portion of the cut-out and the patch of the first acoustic element, said propagating surface acoustic waves intercepted by the first acoustic element comprising a portion of the surface acoustic waves that interact with the reflective array.

14. The apparatus of claim 1, wherein the first acoustic element comprises a cut-out of a layer of acoustically benign material applied along a border of the first surface and an acoustic material filling in the cut-out, said first and second materials being visually distinguished from one another.

15. The apparatus of claim 1, wherein the first acoustic element comprises acoustic material applied on the first surface and disposed under a layer of acoustically benign material applied along a border of the first surface.

16. The apparatus of claim 15, wherein the layer of acoustically benign material comprises a first opaque ink and the acoustic material of the first acoustic element comprises a second opaque ink having different visual properties than the first opaque ink.

17. The apparatus of claim 15, wherein the second acoustic element comprises acoustic material disposed adjacent the first acoustic element and either over or under the layer of acoustically benign material applied along the border of the first surface.

18. The apparatus of claim 1, wherein the second acoustic element is formed with a composite of two or more separated shapes that combine to form a split compensating pattern of the first acoustic element.

19. An acoustic touch apparatus, comprising:
a substrate having surfaces configured to propagate surface acoustic waves;
at least one acoustic wave transducer on a first surface; and
at least one reflective array on the first surface, said transducer configured to at least transmit or receive surface acoustic waves to or from the reflective array and said reflective array configured to acoustically couple surface acoustic waves to propagate between surfaces of the substrate, and said substrate having a first acoustic element disposed on the first surface that is configured to intercept propagating surface acoustic waves on the first surface and is configured to cause variations in the phase velocity of the propagating surface acoustic waves and a second acoustic element disposed on the first surface to equalize the variations, wherein the second acoustic element is formed with a composite of two or more separated shapes that combine to form a split compensating pattern of the first acoustic element.

20. The apparatus of claim 19, wherein the second acoustic element is configured to cancel out the phase advance or delay of any portion of the propagating surface acoustic waves intercepted by the first acoustic element.

21. The apparatus of claim 19, wherein the second acoustic element is disposed on the first surface in proximity to the first acoustic element.

22. The apparatus of claim 19, wherein the second acoustic element is disposed on the first surface as physically close as possible to the first acoustic element.

23. The apparatus of claim 19, wherein the second acoustic element is configured to intercept propagating surface acoustic waves intercepted by the first acoustic element.

24. The apparatus of claim 23, wherein the second acoustic element is configured to intercept propagating surface acoustic waves parallel to the propagating surface acoustic waves intercepted by the first acoustic element.

25. The apparatus of claim 23, wherein the second acoustic element counteracts the phase advance of any portion of the propagating surface acoustic waves intercepted by the first acoustic element.

26. The apparatus of claim 24, wherein the second acoustic element counteracts the phase advance of a portion of the propagating surface acoustic waves parallel to the propagating surface acoustic waves intercepted by the first acoustic element.

27. The apparatus of claim 19, wherein the first acoustic element comprises a patch of acoustic material applied over a cut-out of a layer of acoustically benign material applied along a border of the first surface.

28. The apparatus of claim 27, wherein the layer of acoustically benign material comprises a first opaque ink and the patch of acoustic material comprises a second opaque ink having different visual properties than the first opaque ink.

29. The apparatus of claim 27, wherein the second acoustic element comprises acoustic material disposed adjacent the cut-out over the layer of acoustically benign material applied along the border of the first surface and either over or under the patch.

30. The apparatus of claim 27, wherein the second acoustic element comprises acoustic material disposed on the patch over the cut-out.

31. The apparatus of claim 27, wherein the reflective array is disposed over the layer of acoustically benign material along the border of the first surface and at least a portion of the cut-out and the patch of the first acoustic element, said propagating surface acoustic waves intercepted by the first acoustic element comprising a portion of the surface acoustic waves that interact with the reflective array.

32. The apparatus of claim 19, wherein the first acoustic element comprises a cut-out of a layer of acoustically benign material applied along a border of the first surface and an acoustic material filling in the cut-out, said first and second materials being visually distinguished from one another.

33. The apparatus of claim 19, wherein the first acoustic element comprises acoustic material applied on the first surface and disposed under a layer of acoustically benign material applied along a border of the first surface.

34. The apparatus of claim 33, wherein the layer of acoustically benign material comprises a first opaque ink and the acoustic material of the first acoustic element comprises a second opaque ink having different visual properties than the first opaque ink.

35. The apparatus of claim 33, wherein the second acoustic element comprises acoustic material disposed adjacent the first acoustic element and either over or under the layer of acoustically benign material applied along the border of the first surface.

* * * * *